United States Patent
Mörsberger et al.

(10) Patent No.: US 7,437,655 B2
(45) Date of Patent: Oct. 14, 2008

(54) APPARATUS AND METHOD FOR FLEXIBLE DATA RATE MATCHING

(75) Inventors: Gerd Mörsberger, Bubenreuth (DE); Stefan Schütz, Forchheim (DE); Georg Spörlein, Hirschaid (DE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 875 days.

(21) Appl. No.: 10/500,538

(22) PCT Filed: Sep. 18, 2002

(86) PCT No.: PCT/EP02/10448

§ 371 (c)(1),
(2), (4) Date: Dec. 16, 2004

(87) PCT Pub. No.: WO03/056743

PCT Pub. Date: Jul. 10, 2003

(65) Prior Publication Data

US 2005/0105605 A1    May 19, 2005

(30) Foreign Application Priority Data

Dec. 31, 2001    (EP) .................. 01131055

(51) Int. Cl.
*H03M 13/03*    (2006.01)
*H04J 3/22*    (2006.01)

(52) U.S. Cl. ...................... 714/790; 370/545

(58) Field of Classification Search ............... 714/746, 714/790

See application file for complete search history.

(56) References Cited

U.S. PATENT DOCUMENTS

| | | | |
|---|---|---|---|
| 4,462,101 A | 7/1984 | Ogawa et al. | |
| 4,908,827 A | 3/1990 | Gates | |
| 5,566,189 A | 10/1996 | Laskowski | |
| 6,014,411 A | 1/2000 | Wang | |
| 7,145,917 B1 * | 12/2006 | Qian | ........................ 370/465 |
| 7,187,699 B1 * | 3/2007 | Raaf et al. | ................... 370/545 |

FOREIGN PATENT DOCUMENTS

| WO | WO 99 31808 A | 6/1999 |
|---|---|---|
| WO | WO 9931808 | 6/1999 |

OTHER PUBLICATIONS

European Patent Office, International Search Report dated Dec. 30, 2002 for PCT/EP02/10448.

* cited by examiner

Primary Examiner—Shelly A Chase

(57) ABSTRACT

This invention relates to a flexible rate matching method, comprising the steps of: a) receiving a continuous stream of data items at a prespecified rate of a clock signal in a configurable data shift register; b) storing, for each data item stored in the data shirt register, an associated indication of validity in a configurable validity shift register and shifting the indications of validity at said prespecified rate; c) modifying the contents of the data shift register and the validity shift register through puncture/repetition operations so as to achieve a rate matching, and d) outputting valid data items at said prespecified rate using said indications of validity stored in the validity shift register. The invention also relates to a corresponding flexible rate matching apparatus as well as to a computer program product and a processor program product.

19 Claims, 17 Drawing Sheets

Shift operations only (no rate-matching required in SB(i))

Repetition of a=1 data item of SB(i)

Repetition of a=3 data items of SB(i)

Legend:
- ☐ : register (memory location) of DSR and VSR, respectively
- [j] : j-th register of DSR/VSR ($r_j$)
- [j]→[k] : shift from register j to register k at [clk i+1]
- [j]→[k]/[l] : shift from register j to register k and l (repetition) at [clk i+1]

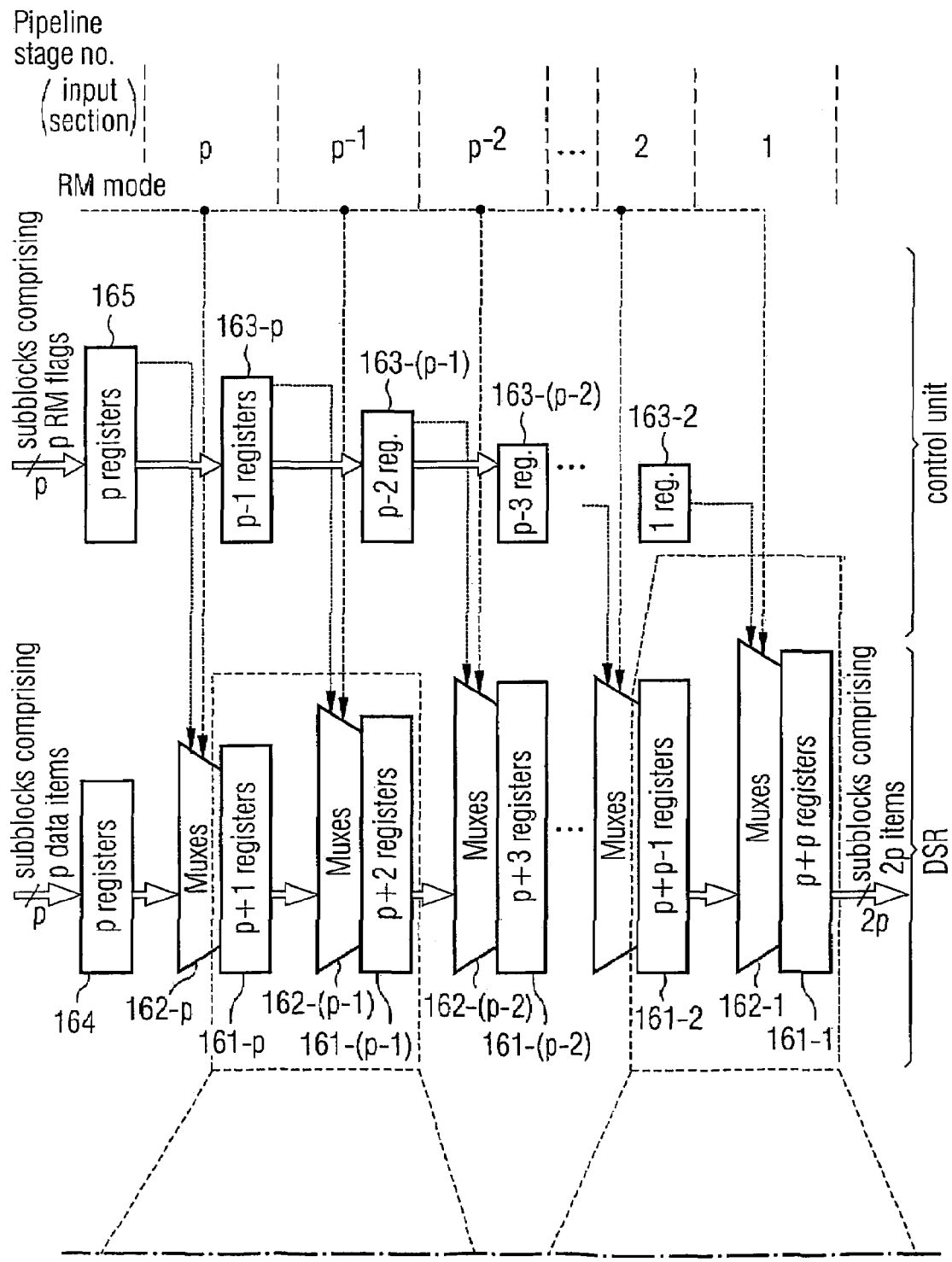

Legend:
- ☐ j : j-th register of DSR
- ▷ : multiplexer

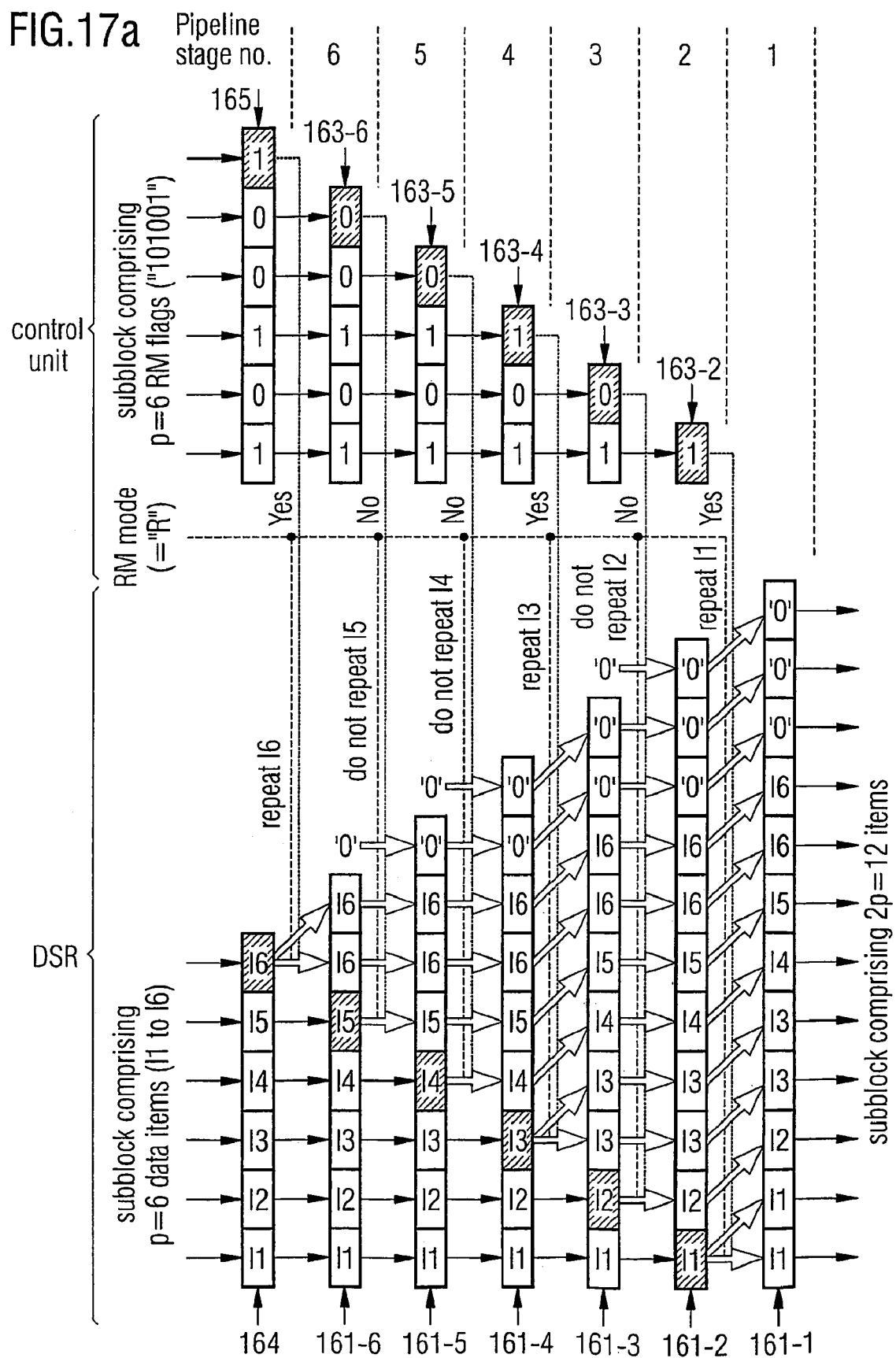

APPARATUS AND METHOD FOR FLEXIBLE DATA RATE MATCHING

FIELD OF THE INVENTION

The present invention relates to rate matching in the baseband part of a transmitter or a transceiver of a telecommunication system, and in particular to a flexible rate matching implementation.

DESCRIPTION OF THE PRIOR ART

A transmitter for use in a digital telecommunication system is known, for instance, from 3GPP TS 25.212 V3.4.0 (2000-09) "3rd Generation Partnership Project; Technical Specification Group Radio Access Network; Multiplexing and channel coding (FDD) (Release 1999)", section 4.2. In FIG. 1a of the present application, a block diagramme of parts of such a transmitter is given. As shown, the transmitter includes a channel encoder, a rate matcher, an interleaver, and a modulator. Further components (for frequency up-conversion, amplification etc.) are omitted for reasons of conciseness.

Channel Encoder:

The channel encoder (also referred to as forward error control encoder) adds redundant information to each incoming data block. Thereby, the size (length) of the data block increases from K "uncoded" bits, at the encoder input, to C>K "coded" bits at its output. Herein, the size C of the coded data block depends on, at least, the number K of uncoded bits (in the uncoded data block) and a parameter r commonly referred to as the coding rate. With values in the range of 0<r<1, the coding rate r provides an indication of the degree (extent, scope) of redundancy introduced by the channel encoder: the smaller the value of r, the more redundant information is added.

The way, in which redundant information is generated, depends on the channel coding scheme employed and, more particularly, on functions such as generator polynomials (with parameters such as constraint lengths, e.g.). Typical examples for channel coding schemes are convolutional coding, concatenated convolutional coding such as "turbo" coding, and block coding. The skilled person will readily appreciate that according to some channel coding schemes such as turbo coding, the coded data block may also include a number of so-called "systematic bits", i.e. bits which are identical to the uncoded bits and therefore do not carry any redundant information. In this case, the other bits of the coded data block, i.e. those actually carrying redundant information, are referred to as "parity bits".

The coded data block output by the channel encoder may (or may not) include a certain number of (coded) "tail bits" also referred to as terminating bits. Tail bits are widely used in order to ensure that the encoding process terminates in a pre-defined state, e.g. in the zero state, thus providing the same degree of protection for the last uncoded bits in the incoming data block (compared with other uncoded bits). Similarly, tail bits ensure that the decoder in the receiver reaches a predetermined final state. In other words, tail bits ensure a proper termination of the decoder trellis.

The size C of the coded data block-generated by the channel encoder of FIG. 1a can be described for instance by the equation $$C=K/r+T_C=(K+T_U)/r \text{ with } T_U \geq 0, T_C \geq 0, \quad (1)$$

wherein K and r denote the number of uncoded bits (i.e. the size of the incoming data block) and the coding rate, respectively. In equation (1), $T_C$ denotes the number of coded tail bits while $T_U$ refers to the number of uncoded tail bits.

Equation (1) states that, out of the C bits contained in the coded data block, K/r bits result from the encoding of the incoming data block (consisting of K uncoded bits and not including tail bits) while a total of $T_C$ output bits was derived from a given number of tail bits introduced inside the channel encoder of FIG. 1a. In case of convolutional coding, a number $T_U$ of uncoded tail bits is typically encoded into a total of $T_C = T_U/r$ coded tail bits so that the first and second parts of equation (1) apply to this case. With turbo coding, e.g., an internal feedback of the last encoder state ensures that the encoding process terminates in the pre-defined state. In the coded data block output by the turbo encoder, this results in a number $T_C$ of coded tail bits so that the first part of equation (1) applies.

In most applications, the coding rates can be described by expressions of the form r=1/x, wherein x can assume integer values greater than or equal to two. In these cases, eq. (1) always delivers integer output values for C, as one would expect for a number of bits in a block. For coding rates of the general form r=y/z with positive integer parameters y and z, however, eq. (1) could in principal deliver non-integer output values. However, this is a rather theoretical case, because the skilled person in the field of channel coding is aware of this problem as well as of solutions to it, such as choosing the number of bits input into the channel encoder and/or the number of (uncoded/coded) tail bits appropriately. For example, in case of a convolutional channel encoder with a coding rate of r=4/9, the skilled person would select the number K of uncoded bits and the number $T_U$ of uncoded tail bits so that their total number is an integer multiple of 4. This exemplary measure would ensure that C assumes a value equal to an integer multiple of 9. In the sequel, references to the size C of the coded data block (and in particular to eq. (1)) assume such obvious measures for obtaining an integer number of coded output bits to have been taken.

In applications where for the same channel coding scheme several coding modes with different coding rates r have to be supported (such as r=1/2 and r=1/3, e.g.), it is rather common, in order to decrease implementational complexity and thus cost of the transmitter, to only implement a single channel encoder hardware capable of encoding at the smallest coding rate (r=1/3 in the above example). This ensures that enough redundant information is generated in a first step, no matter what coding mode actually has to be used. If (and whenever) a coding mode with a higher coding rate (r=1/2, e.g.) is to be performed, the excessive part of the redundant information is simply removed ("punctured") from the output of the channel encoder hardware, in a subsequent step. In the sequel, such puncturing, i.e. puncturing performed (a) after channel coding as such, i.e. after redundant information has been generated, and (b) for the purpose of achieving a desired (higher) coding rate, is considered part of the rate matcher (as described below) rather than part of the channel encoder, because a coded data block (coded at a coding rate of r=1/3 in the above example) is adjusted in size.

Interleaver, Modulator etc.:

The purpose of the interleaver is to change the order of data bits inside each coded data block in order to ensure that a temporary disturbance during transmission of the data block (over the physical channel) does not lead to a loss of many adjacent coded data bits, since such a loss in many cases would be unrecoverable at the receiver side. Then, the modulator converts the interleaved data bits into symbols which, in general, are complex-valued. Further components, such as digital-to-analog conversion, frequency up-conversion and amplification are not shown in FIG. 1a for conciseness reasons. Finally, a signal is transmitted over the physical channel (the air interface, a wireline etc.).

The channel encoding scheme, the interleaving scheme, and the modulation scheme are specified in detail by the communication standard according to which the telecommunication system is to be operated. For example, in third generation (3G) mobile communication standards such as WCDMA (wideband code division multiple access), two channel coding schemes are specified apart from the "no coding" case: convolutional coding and turbo coding. With these coding schemes, several coding rates are to be used (r=1/2, r=1/3, and others). Also, the uncoded data blocks supplied to the channel encoder may have different sizes K. For these reasons, 3G systems will have to support many different coded data block sizes $C\_i$, i=1, 2, . . . also referred to as different "transport channel types", wherein the block sizes may vary over a wide range (from a few bits to more than 10000 bits, e.g.). On the other hand, due to different physical channel sizes, several interleaving schemes with different interleaver sizes $M\_j$, j=1, 2, . . . may have to be supported. For example, the WCDMA standard specifies seven different interleaver sizes in the uplink and 17 in the downlink.

In order to match the channel encoder output to a given time slot and/or frame structure, several transport channel types with different (but maybe similar) coded data block sizes $C\_i$ should use the same physical channel type (having a given size referred to as target block size in the following).

Rate Matcher:

For this to become possible, a rate matcher is typically introduced between the channel encoder and the interleaver, as shown in FIG. 1a. Although it is clear from the above, that a single communication system may have to support several or even many combinations of coded block-sizes $C\_i$ and target block sizes $M\_j$, the following generic description is based, for simplicity and clarity reasons, on a single combination of a coded data block size C and a target block size M. The rate matcher shown in FIG. 1a either adds (inserts) to each coded data block or deletes (removes, "punctures") from each coded data block a certain number of bits in order to obtain a rate-matched data block having a given target block size of M bits (which is, e.g., the size of an interleaver or a particular block length required for transmission). For this purpose, the rate matcher has to add M−C bits to the coded data block, if C is inferior to M, or to remove (puncture) C−M bits therefrom, if C is superior to M, so as to adapt the block size C to said target block size M. In cases where M is equal to C, no adjustment in size is necessary, of course. With the definition $$A = M - C \quad (2)$$

the functionality of the rate matcher can be described as adjusting the size of the coded data block by a number |A| of bits with |A| denoting the magnitude of A, wherein for A>0 (i.e. C<M) the rate matcher adds A bits to the coded data block, while for A<0 (i.e. C>M), it removes |A|=−A=C−M bits therefrom. In case of A=0 (i.e. M=C), obviously, no adjustment in size is required.

Although in principle, the bits to be added (inserted) in case of A>0 could have any value, the receiver performance can be improved if bits of the coded data block are repeated instead of, e.g., adding bits with fixed values. For this reason, typically, the expression "adding A bits" is equivalent in meaning to "repeating" said number of bits so that in the rate-matched data block, A bits represent copies of A "original" bits contained in the coded data block. As long as not all C bits of the coded data block are repeated, these repetition schemes are referred to as "unequal repetition" schemes.

The positions inside each coded data block (together with the number of repetitions, if applicable), where bits are to be repeated or deleted, are also specified in detail by the communication standard according to which the telecommunication system is operated. Herein, the positions can either be specified directly (by listing bit indices, e.g.) or by an algorithm to be executed in order to determine said bit indices, as will be explained below in more detail.

It should be noted that, depending on the application under consideration, the parameter |A| can assume rather high values (in the hundreds or even thousands of bits). This can lead to a considerable implementational complexity, because for each bit to be repeated or deleted, its position inside the coded data block, along with the number of repetitions (if applicable), has to be determined or stored both in the transmitter and in the receiver, as will be seen below.

With the knowledge of the positions inside each coded (or rate-matched) data block, where bits were repeated or deleted by the rate matcher in the transmitter, the receiver is able to reconstruct a decoded data block (corresponding to the uncoded data block) comprising K bits from the received data block.

GSM Example for a Rate Matcher:

As an example for a rate matcher according to the prior art, FIG. 1b shows a block diagramme of a puncturing unit 100 adapted to the GSM standard. In case of the GSM traffic channel "F96", the coded data blocks supplied to the puncturing unit comprise C=488 bits, while the rate-matched data blocks to be output by the puncturing unit must have a target block size of M=456 bits, so that |A|=|M−C|=|456−488|=32 bits must be punctured according to equation (2). For this purpose, the puncturing unit 100 shown in FIG. 1b comprises a shift enable unit 101 having a counter 102, a comparison unit 103, and a position memory 104. Further, the puncturing unit 100 comprises a shift register 105 and a memory 106.

Operatively, the coded data block (input data block) comprising C coded bits (input bits) is shifted into the shift register 105 in a bit-serial manner at the respective input bit rate. In this example, the shift register 105 has a width of 8 bits. When the shift register is filled up, its contents (i.e. 8 input bits) will be stored, in a single step (i.e. parallely), in the memory 106 having a width of 8 bits. Thereafter, the serial supply of input bits to the shift register 105 is resumed (continued). Further, the counter 102 in the shift enable unit 101 counts the input bits in each input data block. The comparison unit 103 of the shift enable unit 101 compares the counter value with the (in this example: 32) puncturing positions stored in the position memory 104 of the shift enable unit 101. In case the comparison unit 103 determines a coincidence of the counter value and one of the puncturing positions, the respective shift operation in the shift register 105 is suppressed (not enabled) thus achieving the puncturing. In other words, an input bit to be punctured will not be shifted into the shift register 105 (or alternatively: will be overwritten in the shift register by the subsequent input bit), and therefore will not be written into the memory 106 at a later stage.

A rate matcher according to FIG. 1b may only be used for a single puncturing scheme according to, e.g., the GSM standard. However, in view of 3G mobile communication standards such as WCDMA, several problems arise.

Rate Matching Requirements:

In existing implementations according to, e.g., the GSM standard, the input data blocks (coded data blocks, e.g.) are input bit-serially, at the respective input bit rate, to the rate matcher. In view of the high input bit rates specified by 3G standards such as WCDMA, it is not possible to serially process the input bits at these high input bit rates. In other words, existing rate matching implementations do not support a parallel input and processing of input bits (coded bits, e.g.) which is a prerequisite to meeting future throughput and delay requirements, as the following example will show. Consider, e.g., the rate matching of 1024 channels, each being a voice channel with 320 coded bits supplied serially within a time period of 2.5 ms so that the associated input bit rate (clock rate) equals to 131 MHz.

At this clock rate, it would be very difficult to implement the rate matcher according to FIG. 1b in FPGA (field programmable gate array) or ASIC (application specific integrated circuit) technology. If, however, a 4 bit parallel processing was possible, the clock rate could be reduced to 32 MHz. The skilled person will readily appreciate that, at this clock rate, the rate matcher could very well be implemented in FPGA or ASIC technology.

As already outlined above, according to 3G mobile communication standards such as WCDMA, rate matchers will have to be implemented for many different transport channel types and data rates. A straightforward solution to this problem would consist in implementing several rate matchers according to the prior art and operate them in a parallel manner (different rate matchers for different transport channel types and/or data rates). However, such an implementation would lead to a large and complex control logic (using a plurality of counters, memories, etc.) for controlling which data block has to be input into which rate matcher and for assembling the outputs of the rate matchers into a single stream of data. In other words, the implementational effort in terms of the required hardware would exceed typical limitations given for FPGA/ASIC circuits or defined printed circuit board sizes for 3G transmitters.

As stated above, the positions inside each input data block, where bits are to be rate-matched (repeated or deleted), are specified in detail by the communication standard according to which the telecommunication system is operated. Herein, the positions can be specified in a variety of different ways, referred to as "rate matching schemes" in the following.

For small values of |A|, the positions can simply be identified by explicitly listing the indices of the bits to be rate-matched, as described above with respect to the GSM rate matcher. This will be referred to as rate matching scheme RMS1.

To achieve a reduction of at least the required memory hardware in cases where |A| assumes higher values, it has been proposed to not explicitly store all positions of bits to be rate-matched. For example, a 3G standard proposal by the Japanese standardization body ARIB, referred to as rate matching scheme RMS2 herein, does not explicitly list the positions of all bits to be rate-matched but rather defines the distance therebetween, e.g., the information that each 15th bit has to be rate-matched. As this distance is always the same within one input data block only one parameter must be stored (assuming that the position of the first bit to be rate-matched is known).

Nevertheless, in order to achieve any desired value for the target block size M, it may become necessary to further modify the result after the first pass of puncturing/repetition of bits in the initially supplied input data block, i.e. it may be necessary to apply puncturing or repetition recursively. One such example would be the processing of an input data block where, in a first pass, each $16^{th}$ input bit is punctured, then, in a second pass, each $26^{th}$ bit, then, in a third pass, each $98^{th}$ bit, and finally, in a fourth pass, each $156^{th}$ bit, in order to obtain the desired value for the target block size M.

In order to avoid such recursive rate matching schemes, another 3G standard proposal presented by the European standardization body ETSI, referred to as scheme RMS3 herein, defines two different distances between bits to be rate-matched in a non-recursive manner. According to this proposal, there could be a distance of, e.g., 8 bits between the first two bits to be rate-matched and then there could be a distance of, e.g., 9 bits between the $2^{nd}$ and $3^{rd}$ bits to be rate-matched, and then, for instance, again a distance of 8 bits between the $3^{rd}$ and $4^{th}$ bits to be rate-matched etc. Of course, more than two different distances could be specified as well.

The positions where bits are to be rate-matched can also be specified by more complex algorithms which require more or less complex calculations to be executed in order to determine said positions. Examples for such rate matching schemes, referred to as RMS4 herein, can be found in the WCDMA standard (UMTS).

In view of the above, a rate matching implementation should meet the following requirements:
a) it must be capable of coping with high input bit rates; for example, 3G standard proposals (ARIB, ETSI) specify a maximum input bit rate of 1024000 bits/s;
b) it must be capable of coping with a large variety of transport channel types, or equivalently, sizes C of input data blocks, e.g., for ARIB and ETSI: C=160 . . . 10240 bits;
c) it must be capable of coping with a large variety of numbers |A| of bits to be rate-matched; for example, |A| may range from 0 to 1000 bits to be rate-matched in a single input data block;
d) it must be capable of supporting many different rate matching schemes (such as the schemes RMS1, RMS2, . . . described above);
e) it should minimize the delay as measured for instance in terms of the time difference between "first input bit in" and "first output bit out" or "last output bit out", respectively;
f) it should minimize hardware complexity;
e) ideally, a single hardware structure should be able to meet the above requirements (e.g. to implement rate matching no matter how the positions of the bits to be repeated or punctured are specified).

SUMMARY OF THE INVENTION

In view of the above, the object of the invention is to develop a flexible rate matching implementation at minimal costs (low complexity).

According to the present invention, this object is achieved through a flexible rate matching apparatus having the features of claim 1 and also through a flexible rate matching method having the features of claim 9.

Therefore, the flexible rate matching apparatus and method according to the present invention rely on the provision of a dual shift register comprising a configurable data shift register (DSR) and a configurable validity shift register (VSR). In particular, the VSR enables to use validity information (VI), also referred to as indications of validity, as masking information, wherein bits (or data items comprising one or several bits) to be punctured are invalidated without further modification of the contents of the DSR. In case of repetition, the necessary memory space in the DSR may easily be provided through appropriate shifting of subsequent data items in the DSR and appropriate setting of the indications of validity (validity bits) in the VSR. This enables the output of valid data items using the validity information stored in the VSR.

Therefore, the proposed flexible rate matching implementation is highly flexible in the way that a multitude of transport channel types, i.e. sizes C of input data blocks (coded data blocks), may be supported according to, e.g., 3G requirements.

Further, the provision of the VSR allows to support, for each input data block, various kinds of rate matching schemes (RMS1, RMS2, etc.) as described above with respect to the prior art.

Further, the proposed solution supports repetition and puncturing in one functional block which minimizes hardware complexity while ensuring the above-mentioned capabilities and flexibility.

A further benefit of the proposed solution is that a flexible rate matching can be achieved on a continuous stream of data items (and also resulting in a continuous output data stream) without temporarily storing a complete input data block so that only a small memory is necessary and the overall delay is minimized.

According to a preferred embodiment of the present invention it is proposed that a plurality of data items are handled as subblocks during each cycle of the (common) clock signal. In other words, the inventive flexible rate matching approach allows to process a plurality of data items in parallel (i.e. concurrently, simultaneously) during each cycle of the (common) clock signal.

Therefore, the inventive flexible rate matching can cope with extremely high data rates required for, e.g. 3G standards. Therefore, these standards may be supported by still using fast turnaround and easily available FPGA and ASIC technologies. Also with this processing of data items it is possible to work on a continuous data stream without storage of a complete input data block. Again, only a small dual shift register for buffering some of the data items is sufficient, the length of the dual shift register being related to the total number |A| of data items to be rate-matched in an input data block.

According to a further preferred embodiment, the dual shift register and the output handler are controlled by an input and RM (rate matching) control unit and an output control unit, respectively. These control (sub) units are controlled by a flexible RM control unit which coordinates and synchronizes the operations of said two (sub)units. Preferably, the positions of data items which need to be rate-matched (puntured or repeated) according to the rate matching scheme to be employed, can be determined (calculated) in a separate computation unit/step.

This allows to achieve flexible rate matching in a fully programmable way so that changes in a standard can be incorporated with extremely low efforts.

According to another preferred embodiment, in order to perform puncturing operations, the indications of validity (validity bits) associated with data items to be punctured are set to a value indicating non-validity. For example, they can be reset to zero to indicate that the corresponding data item is to be considered invalid (and thus is not to be output). In order to perform repetition operations, both the data items to be repeated and their associated indications of validity (i.e. the associated set validity bits) are each shifted to at least two memory locations (registers) of the data shift register and the validity shift register, respectively.

These features lead to a simplified implementation of the flexible rate matching approach with a single hardware structure being able to meet all requirements.

According to another preferred embodiment, rate-matched data items are continuously output. Herein, only valid data items are output, i.e. the data items having an associated indication of validity (validity bit) indicating validity (by a set validity bit, e.g.).

With a continuous stream of output data items, the delay of the flexible rate matching approach can be minimized (thus maximizing the throughput).

According to another preferred embodiment, in order to perform puncturing operations, both the data items to be punctured and their associated indications of validity (i.e. the associated set validity bits) are shifted to no memory location (register) of the data shift register and the validity shift register, respectively. In order to perform repetition operations, both the data items to be repeated and their associated indications of validity (i.e. the associated set validity bits) are each shifted to two memory locations (registers) of the data shift register and the validity shift register, respectively.

These features lead to a further simplified implementation of the flexible rate matching approach while still meeting the other requirements.

According to another preferred embodiment, rate-matched data items are output on a not fully continuous basis, i.e. no output may be generated at some points in time, although the output rate still is equal to the rate of the common clock.

With a stream of output data items which is not entirely continuous, the requirements of subsequent functional blocks such as interleavers can be met.

According to another preferred embodiment, said dual shift register includes at least two pipeline stages each having a different number of memory locations.

By providing the dual shift register with pipeline stages comprising, from stage to stage, a different number of memory locations (registers), complexity can be further reduced because the rate-matching can be done for a single data item (and associated validity bit) at a given time (in a given pipeline stage).

According to a preferred embodiment of the present invention it is proposed to carry out the flexible rate matching using a cascade structure. By cascading the flexible rate matching apparatus according to the present invention it is possible to realize a recursive rate matching algorithm hardware.

In particular, a complex recursive rate matching algorithm may be implemented using a plurality of. flexible rate matching apparatuses according to the present invention. It is possible to calculate parameters in a separate computation device and to then write them into a storage of each of the flexible rate matching apparatuses. Also, it should be noted that the cascade structure of flexible rate matching apparatuses is suitable both for the serial and parallel implementation.

According to another preferred embodiment of the present invention there is provided a computer program product directly loadable into the internal memory of a mobile communication unit comprising software code portions for performing the inventive flexible rate matching process when the product is run on a processor of the mobile communication unit.

Therefore, the present invention is also provided to achieve an implementation of the inventive method steps on computer or processor systems. In conclusion, such implementation leads to the provision of computer program products for use with a computer system or more specifically a processor comprised in e.g., a mobile communication unit.

This program defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or telephone networks via modems or other interface devices. It should be understood that such media, when carrying processor readable instructions implementing the inventive concept represent alternate embodiments of the present invention.

DESCRIPTION OF THE DRAWINGS

Preferred embodiments of the present invention will, by way of example, be described in the sequel with reference to the following drawings.

DETAILED DESCRIPTION OF THE INVENTION

Figure 2:
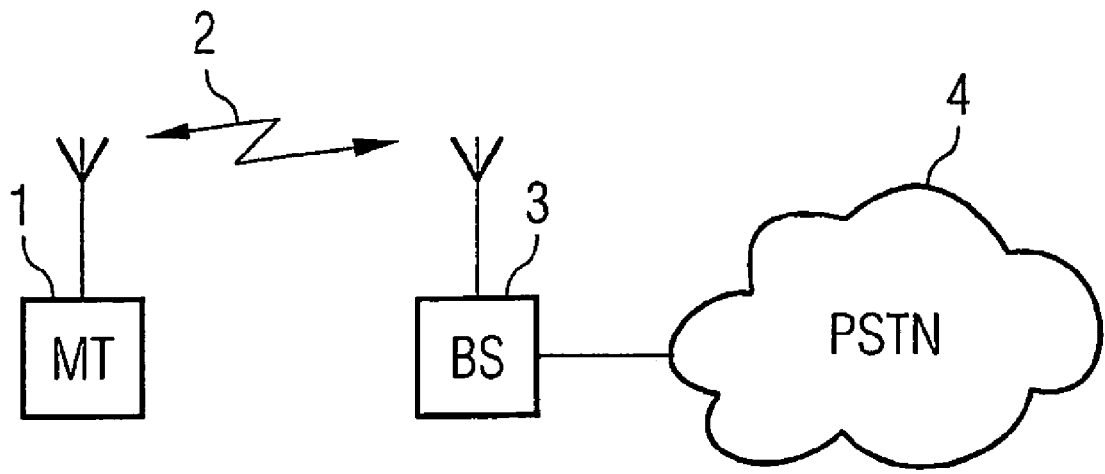
FIG. 2: Block diagram of a radio communication system according to the present invention.

FIG. 2 shows a digital radio telecommunication system according to the invention. A typical application of such a system is to connect a mobile station or mobile terminal (MT) 1 to a core network such as the public switched telephone network (PSTN) 4. For this purpose, the mobile terminal 1 is connected to a base station (BS) 3 via a radio link 2. The radio telecommunication system provides a plurality of base stations which, through other network nodes such as controllers, switches and/or gateways (not shown) are connected to the PSTN 4. Each base station typically supports, at any one time, many radio links 2 towards different mobile terminals 1.

The radio telecommunication system shown in FIG. 2 could for instance be operated according to cellular mobile communication standards such as GSM, PDC, TDMA, IS-95, WCDMA. It should however be mentioned that the invention generally applies to digital telecommunication systems no matter whether they are radio (i.e. wireless) or wireline telecommunication systems. Moreover, the invention also applies to uni-directional ("one-way") communication systems such as broadcasting systems.

Figure 3:
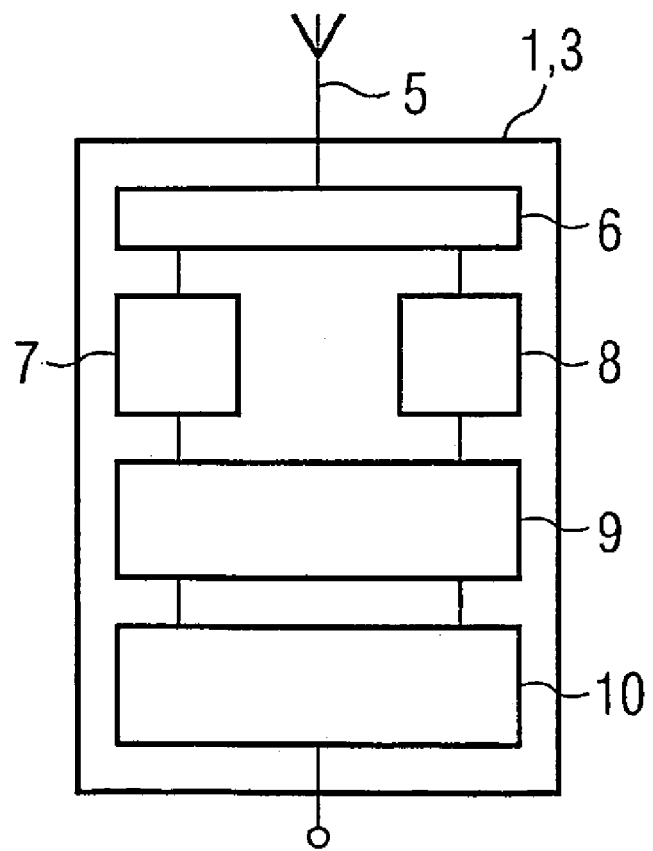
FIG. 3: Block diagramme of a transceiver in a radio communication system according to the present invention.

FIG. 3 shows a block diagramme of a transceiver used in mobile terminals and base stations. Both the mobile terminal 1 and the base station 3 are equipped with one (or several) antenna(s) 5, an antenna duplex filter 6, a radio frequency receiver part 7, a radio frequency transmitter part 8, a baseband processing unit 9 and an interface 10. In case of a base station, the interface 10 is an interface towards a controller controlling the operation of the base station, while in case of a mobile terminal, the interface 10 includes a microphone, a loudspeaker, a display etc., i.e. components necessary for the user interface.

Figure 1A:
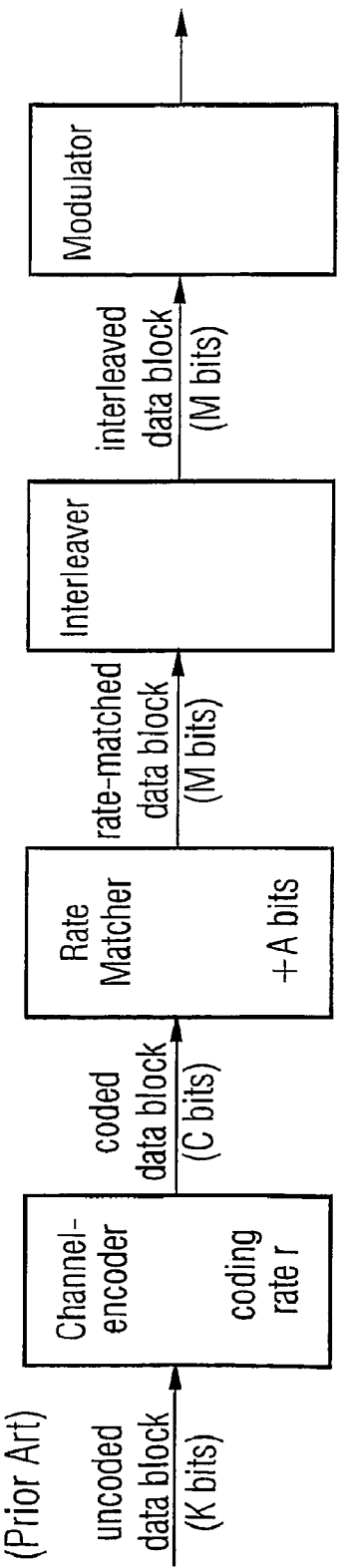
FIG. 1: Block diagram of a transmitter (a) and a rate matcher (b) according to the prior art.
Figure 1B:
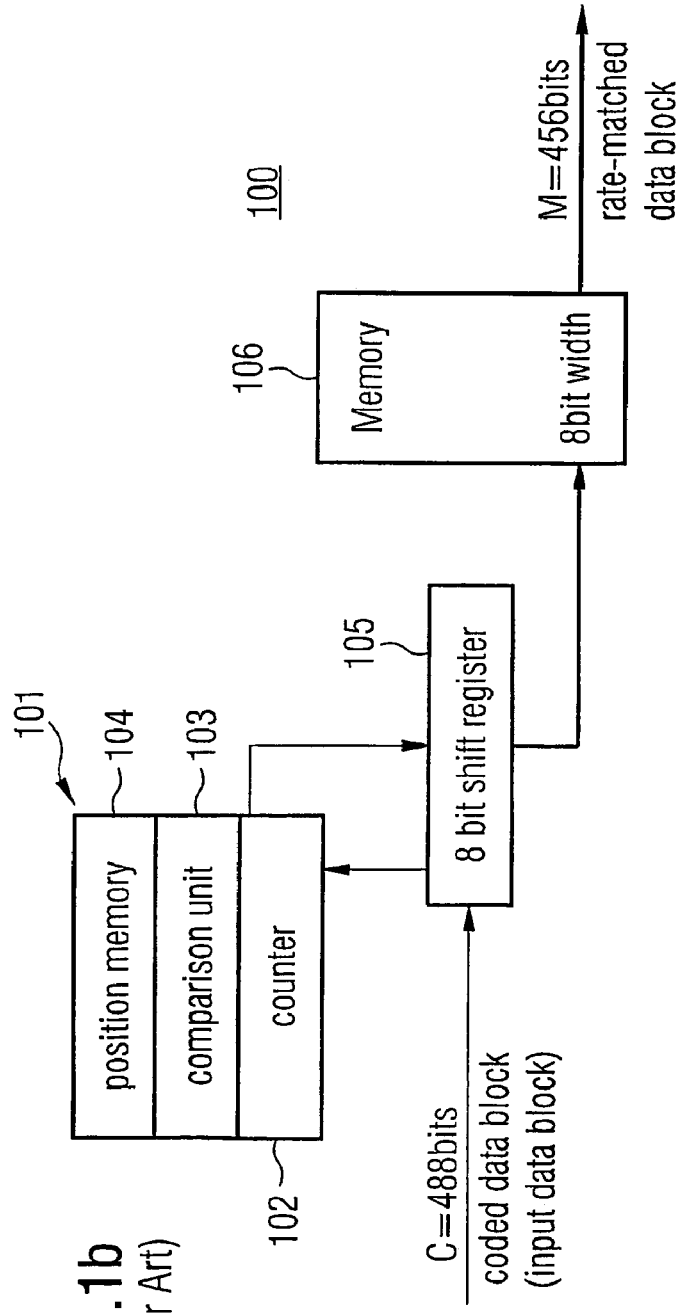

The present invention relates to the baseband processing unit 9, parts of which have already been described above with respect to FIG. 1a. The skilled person will readily appreciate that instead of transceivers each having a common baseband processing unit for both the transmission and the reception branches, in uni-directional (broadcasting) communication systems, there are transmitters each including a first baseband processing unit for the transmission branch only and separate receivers each including a second baseband processing unit for the reception branch only. The invention applies to baseband processing units for at least the transmission branch.

The person skilled in the art will also appreciate that such baseband processing units can be implemented in different technologies such as FPGA (field programmable gate array), ASIC (application specific integrated circuit) or DSP (digital signal processor) technology. In these cases, the functionality of such baseband processing units is described (and thus determined) by a computer program written in a given programming language such as VHDL, C or Assembler which is then converted into a file suitable for the respective technology.

The concept underlying the flexible rate matching approach according to the invention is explained in the following with respect to FIGS. 4 and 5. It is assumed that the input data block (typically output by the channel encoder) comprises C bits, or in more general terms, C "data items", wherein a data item may consist of a single bit or a plurality of bits. Given a desired number M (target block size) of data items in the rate-matched (output) data block, a total of A=M−C data items has to be rate-matched according to equation (2).

Figure 4:
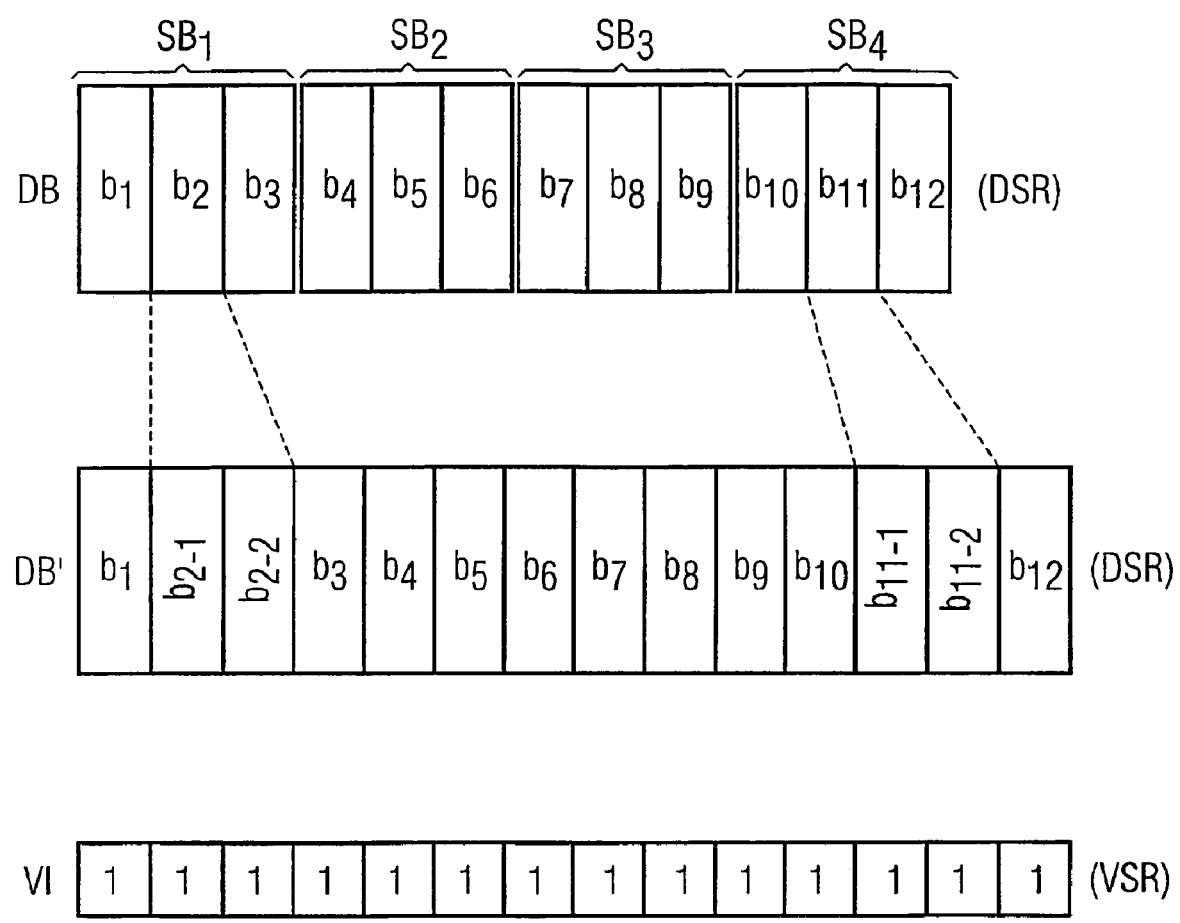
FIG. 4: Principle of flexible rate matching (data item repetition) according to the present invention.
Figure 5:
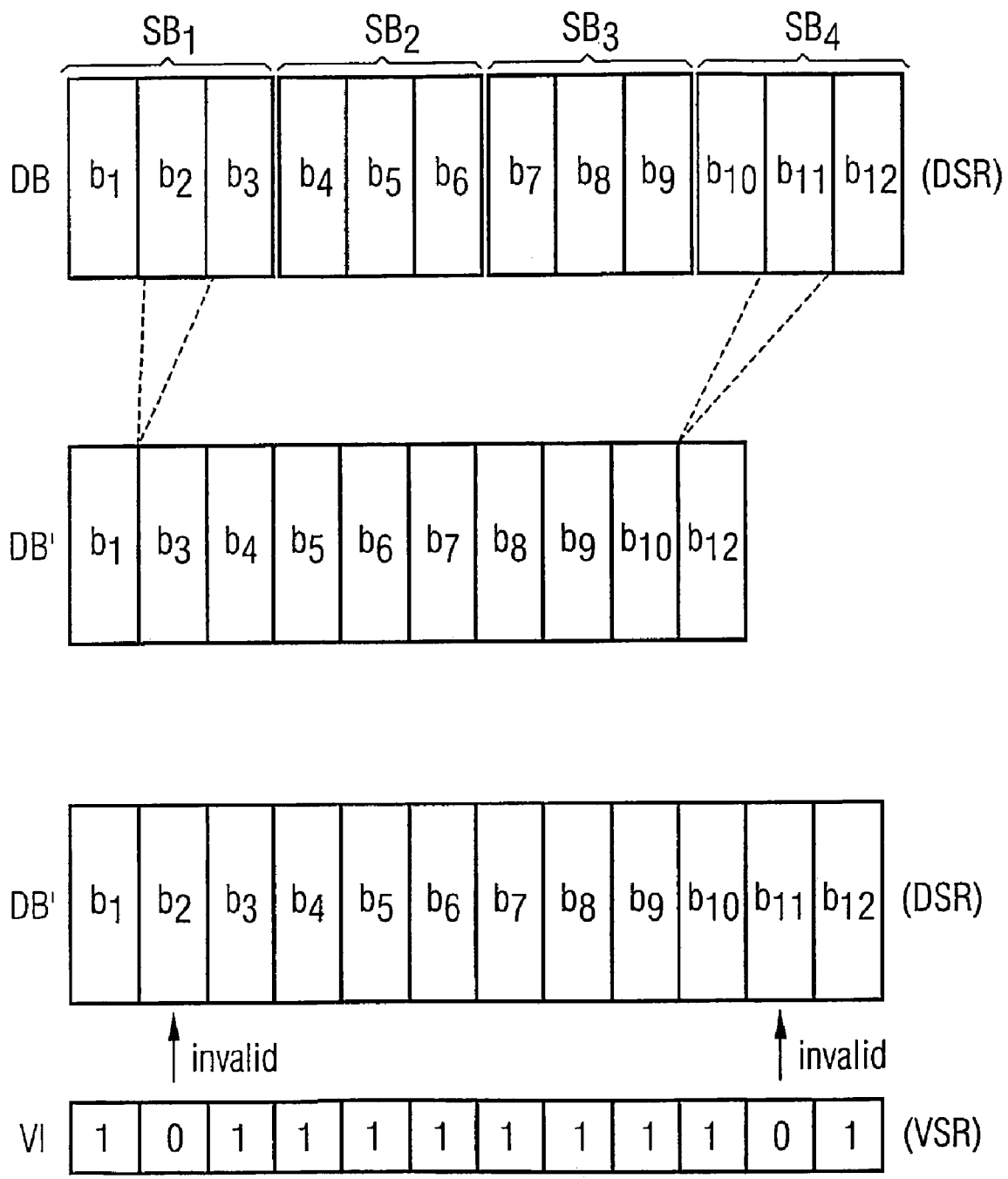
FIG. 5: Principle of flexible rate matching (data item puncturing) according to the present invention.

For reasons of clarity and conciseness, only a part of the input data block (and thus the rate-matched data block) is considered in FIGS. 4 and 5. This part of the input data block is denoted data block DB. It is further assumed in both Figures that the data block DB includes 12 data items as defined above.

Also, in both Figures, it is assumed that in the data block DB, two data items have to be rate-matched, wherein FIG. 4 relates to the repetition of these two data items while FIG. 5 is devoted to the puncturing of the two data items. Note that according to the present invention there is no particular restriction on the way in which the data items to be rate-matched are selected, i.e. on the rate matching scheme as described above with respect to the prior art (RMS1, RMS2, etc.).

The resulting modified data block, denoted DB', will, when output from the rate matcher, represent a part of the rate-matched data block.

FIG. 4 shows the basic principles underlying the flexible rate matching approach as far as the repetition case is concerned (M>C, A=M−C>0). An exemplary data block DB comprising 12 data items b1, b2, . . . , b12 is shown in the upper part. The modified data block DB' resulting from the repetition of two data items is shown in the middle part of FIG. 4.

As also shown in the upper part of FIG. 4, according to a preferred implementation of the present invention, each data block DB is organized into a plurality of subblocks SB1, SB2, SB3, SB4, . . . , each including a number p of data items, wherein p will be referred to as the order of "parallelization" in the following and p=1 refers to the case of a non-parallelized input handling. As an example, the upper part of FIG. 4 shows subblocks SB1 . . . SB4 with p=3 data items each. The impact of the organization of the data block DB into a plurality of subblocks comprising p>1 data items is that for each subblock, a plurality of data items (p data items) may be considered simultaneously. In other words, the present invention preferably relies on a parallelized approach to rate matching.

In the repetition case, it is necessary to achieve a duplication/multiplication of certain data items. For example, the data item b2 (in subblock SB1 of data block DB) is duplicated into the data items b2-1 and b2-2 in the modified data block DB' and the data item b11 (in subblock SB4) is duplicated into the data items b11-1 and b11-2 in the modified data block DB'.

In addition to the data blocks DB and DB', FIG. 4 shows in its bottom part validity information (VI) associated to the modified data block DB'. More particularly, according to the present invention, it is proposed to provide, for each data item, an indication of validity referred to as "validity bit" in the following. This allows to indicate whether a certain data item is to be considered valid or invalid or, in other words, whether or not it is to be considered a data item to be output by the rate-matcher at a later stage. Apart from parallelization of rate matching, the present invention thus also relies on the provision of validity information for each data item.

In its bottom part, FIG. 4 shows that all data items of the data block DB', i.e. both the original and the repeated (duplicated) data items, are considered valid. This is indicated by the validity bits all having a value of one (while non-validity would be indicated by a value of zero). The skilled person will readily appreciate that any value can be used to indicate validity and non-validity, respectively, of the associated data item. In the following, a validity bit will be referred to as a "set validity bit" (in the sense of 'set to a value corresponding to validity', e.g. one) in order to indicate validity, or as a "reset validity bit" (in the sense of 'reset to a value corresponding to non-validity', e.g. zero) in order to indicate non-validity of the associated data item.

For example, the data blocks DB and DB' shown in FIG. 4 can be stored in a first shift register referred to as "data shift register" (DSR), while the validity information VI can be stored in a second shift register referred to as "validity shift register" (VSR).

The skilled person will readily appreciate that a shift register includes a plurality of registers (memory locations), wherein data is shifted from registers to other registers at a given clock rate. In order to enable the one-to-one relation between the data items stored in the registers of the DSR and the associated validity bits stored in the registers of the VSR, it is clear that both shift registers will have the same number of registers. In order to maintain said one-to-one relation during shift operations, the skilled person will readily appreciate that both shift registers will have to use the same (common) clock rate (e.g. by applying the same clock signal). A pair of shift registers having these properties will be referred to as a "dual shift register" in the following.

The common clock rate mentioned above will have to correspond to the rate at which the subblocks (comprising p>0 data items) are input into the DSR. For p=1 (no parallelization), it will thus correspond to the rate of the data items, while it will be p times slower for p>1 (with parallelization). In the latter case (p>1), the DSR and VSR must however be adapted to receive subblocks of p data items (DSR) and subblocks of p validity bits (VSR), respectively, within a single period of the common clock signal instead of receiving only a single data item/validity bit for p=1.

Also, the skilled person will readily appreciate that each register of the DSR must be able to store a data item (i.e. one or several bits) while the registers of the VSR have to store a single bit, only.

FIG. 5 shows the basic principles underlying the flexible rate matching approach as far as the puncturing case is concerned (M<C, A=M−C<0). The upper part of FIG. 5 again shows the exemplary data block DB composed of a plurality of subblocks SB1, SB2, . . . each including p=3 data items, as described above with respect to FIG. 4. In contrast to FIG. 4, FIG. 5 relates to the puncturing case, where the data items b2 (in subblock SB1) and b11 (in subblock SB4) are to be removed.

Typically, one would expect that due to the puncturing of the data items b2 and b11, the other data items b3-b10 and b12 are shifted such that no "gaps" remain in the DSR between the data items considered for output, as shown by the upper data block DB' in FIG. 5. In contrast, the present invention uses the concept of validity information (VI) as explained above with respect to FIG. 4 for the repetition case. In the puncturing case, the data items in the data block DB remain unchanged, as can be seen from the bottom data block DB' in FIG. 5, while the validity bits associated with the data items to be punctured are reset, e.g., to a value of zero, as explained above. For this reason, the validity bits associated with the data items b2 and b11 are reset in the example of FIG. 5.

Thus, by the addition of validity information, unnecessary shift operations in the DSR may be avoided so that the overall complexity of the rate matching process and related hardware is reduced.

In conclusion, the important aspects underlying the present invention and illustrated with respect to FIGS. 4 and 5 may be summarized as follows:

a) It is proposed to add validity information (in the form of validity bits, e.g.) to each data item stored in the data shift register (DSR). Each validity bit indicates whether or not the associated data item is to form part of the output of the rate matching process. For data items to be punctured (removed), the validity bits are reset, while they are set for data items not to be rate-matched as well as for those representing copies or original data items in case of repetition. Finally, only valid data items (i.e. those with set validity bits) are output by the rate matching process.

b) For the implementation of the rate matching process, not only a single shift register is proposed but a dual shift register divided into a data shift register (DSR) and a validity shift register (VSR) for storing the data items and the validity information, respectively. Both shift registers have the same number of memory locations (registers) and use the same (common) clock rate/signal.

c) Further, the input of data items is organized into subblocks each comprising a number p>0 of data items. For p=1, the data items are input serially, while for p>1, a plurality of data items may be considered simultaneously to achieve a parallelization for the rate matching process and implementation.

With these aspects in mind, the flexible rate matching process according to the present invention can be decomposed into several (sub)processes.

In a first subprocess, data items are input into the data shift register (DSR) in the form of subblocks input at a prespecified rate of a common clock signal. Simultaneous to the input of each subblock (comprising p>0 data items) into the DSR, another subblock comprising p set validity bits is preferably input into the validity shift register (VSR) in order to indicate that the p data items being input are considered valid for a start. This subprocess, referred to as "subblock input" process in the following, continues as long as subblocks are available for input, i.e. until all subblocks of an input data block to be rate-matched have been input.

In a second subprocess, referred to as "subblock rate matching" process in the following, the data items part of the current subblock, i.e. the subblock which has been input into the DSR during the last cycle of the common clock signal, are considered for rate-matching. For this to become possible, it must be clear which data items in the current subblock have to be rate-matched. Here, it may be assumed that the positions of the data items to be rate-matched, i.e. the result of an evaluation of the rate matching scheme to be employed, is either known in advance or generated concurrently during the flexible rate matching process. If, according to these positions, it is necessary to puncture one or several data items of the current subblock, the associated validity bits are reset in order to indicate that the corresponding data items are not to be considered for output. On the other hand, if one or several data items of the current subblock have to be repeated, these data items are duplicated together with the associated validity bits while making sure that no information relating to the preceding subblocks is lost. In any case (even if no rate-matching is to be executed at all in the current subblock), the current subblock is shifted together with the associated validity bits in order to make it possible for this subprocess to consider the next subblock during the next cycle of the common clock signal.

In a third subprocess, as soon as a predetermined number of data items (or equivalently, subblocks) has been input into the DSR, the output of data items, preferably again in a blockwise manner, may start. According to this subprocess, referred to as "subblock output" process in the following, a subblock of p>0 valid data items is output at the prespecified rate of the common clock signal while the associated validity bits are reset in order to indicate that the corresponding data items have been output. This subprocess continues as long as set validity bits are present in the VSR.

From the above, the skilled person will readily appreciate that both shift registers (DSR/VSR) must be configurable/programmable in the sense that a given register can receive data from one of several possible other registers in a configurable/programmable way.

Also, it is clear that the DSR must not be adapted to store complete input data blocks (comprising C data items) but only some subblocks of data items to achieve the overall flexible rate matching.

For these reasons, the present invention achieves the decisive advantage of a significantly reduced hardware effort while still being able to implement all kinds of rate matching schemes (RMS1, RMS2 etc.).

From the above description of the three subprocesses, it is also clear that their execution periods overlap in time. In particular, the continuous input of data items (or subblocks thereof) and the continuous output of rate-matched data items (or subblocks thereof) are carried out concurrently, i.e. simultaneously for a significant period of the execution time of the overall flexible rate matching process. Also, data items (or subblocks thereof) are continuously input and output at the same rate, i.e. at the rate of the common clock signal.

Figure 6:
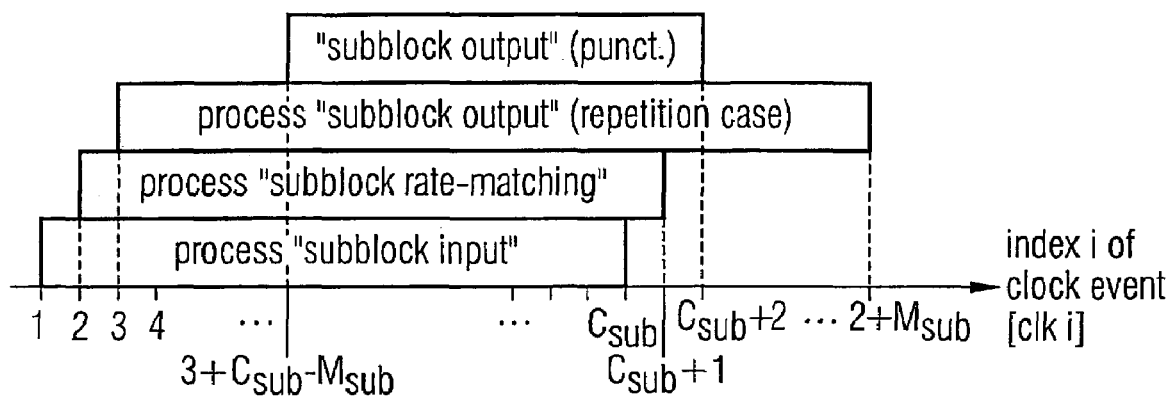
FIG. 6: Temporal relation between (sub)processes of the flexible rate matching method according to the present invention.

FIG. 6 illustrates the overlapping execution periods of the processes "subblock input", "subblock rate-matching" and "subblock output" as described above. For a detailed description of the duration of these processes as well as of the instants in time, when these processes start and finish their operations, respectively, a number of parameters is needed. Note that the following definitions and equations will be adhered to throughout this document.

Assuming that the overall input data block to be rate-matched comprises C data items and the overall output data block (i.e. the rate-matched data block) is to comprise M data items, it can be stated that, according to equation (2), a total of $|A|=|M-C|$ data items has to be rate-matched by repetition or puncturing of data items. Subdividing said input and output data blocks into subblocks each comprising p>0 data items, wherein p is referred to as the order of parallelization, the following parameters can be defined:

$$C_{Sub}=ceil\{C/p\} \quad (3)$$

$$M_{Sub}=ceil\{M/p\} \quad (4)$$

$$A_{Sub}=M_{Sub}-C_{Sub} \quad (5)$$

wherein "ceil" denotes the ceiling operation delivering the smallest integer value equal to or superior to its argument. In equations (3) and (4), $C_{Sub}$ and $M_{Sub}$ denote the number of subblocks in the input and output data blocks, respectively, wherein due to the ceiling operations, it may be necessary in case of p>1 to pad the last (input and/or output) subblock of data items with dummy data items (with zero values, e.g.) in order to obtain a full subblock comprising p items. According to equation (5), $A_{Sub}$ indicates the difference between the numbers of subblocks in the output and input data blocks, respectively. Note that for p>1, in the subblock notation according to equations (3)-(5), the repetition case is characterized by $M_{sub} \geq C_{Sub}$ (and thus $A_{Sub} \geq 0$) and the puncturing case is characterized by $M_{Sub} \leq C_{Sub}$ (and thus $A_{Sub} \leq 0$) while on the level of data items (or equivalently, for p=1), the equal sign ("=") cannot apply (M>C and A>0 for the repetition case and M<C and A<0 for the puncturing case).

In order to simplify the temporal description of processes and the temporal relations between operations performed by said processes, let "[clk i]" denote the i-th event (falling or rising edge, e.g.) of the common clock signal applied to both DSR and VSR "[clk i]": i-th event of common clock signal. (6)

For example the fifth event of said common clock signal will be denoted by "[clk 5]".

FIG. 6 will now be described with the help of the parameters and definitions according to equations (3) to (6). On the horizontal axis shown in FIG. 6, time is indicated in terms of the index i of the clock event [clk i] as defined above with respect to equation (6). For example, the fifth event of said common clock signal is identified by i=5 on the horizontal axis of FIG. 6.

As can be seen from FIG. 6, the process "subblock input" starts to input subblocks of data items at the time of the first event (i=1) of the common clock signal (wherein, of course, any arbitrary offset can be added to the values of i). This process terminates its operations once all $C_{Sub}$ subblocks according to equation (3) have been input. This will be the case just after the i=$C_{Sub}$-th event of the common clock signal.

The process "subblock rate-matching" starts its operations with the second event (i=2) of said common clock signal, as shown in FIG. 6, i.e. one clock cycle later than the "subblock input" process. Subsequently, it operates in parallel (simultaneously) to the "subblock input" process until it terminates its operations one cycle after the process "subblock input", i.e. just after the event i=$C_{Sub}$+1 of said common clock signal.

As far as the process "subblock output" is concerned, it can be stated that this process will terminate its operations when $M_{Sub}$ subblocks according to eq. (4) have been output. For this to be achieved, a total of $M_{Sub}$ cycles of said common clock signal will be required. When, however, it comes to the point in time where this process can begin with its operations, the two cases of repetition and puncturing have to be distinguished, as indicated in FIG. 6 by the two different execution periods relating to this process.

In case of repetition ($M_{Sub} \geq C_{Sub}$), the "subblock output" process can begin to output subblocks of data items one clock cycle after the start of the process "subblock rate-matching", or equivalently, two cycles after the start of the "subblock input" process, i.e. with the third event (i=3) of said common clock signal. With a duration of $M_{Sub}$ cycles, this process will finish its operations with i=$M_{Sub}$+2 $\geq C_{Sub}$+2, i.e. a number of $A_{Sub}$+2 cycles later than the "subblock input" process.

In case of puncturing ($M_{Sub} \leq C_{Sub}$), however, the "subblock output" process can only begin with its operations once a sufficient number of subblocks in the DSR is ready for output so that an underflow of subblocks and thus an interruption in the otherwise continuous output stream of subblocks can be avoided. The "sufficient" number of output subblocks is given by $|A_{Sub}|$ according to equation (5). Compared with the repetition case, in case of puncturing, the process "subblock output" can therefore only start with a delay of $|A_{Sub}|$ cycles, i.e. at i=3−$A_{sub}$=3−($M_{Sub}$−$C_{Sub}$)=3+$C_{Sub}$−$M_{Sub} \geq 3$, as shown in FIG. 6. With a duration of $M_{Sub}$ cycles, it will finish its operations with i=$C_{Sub}$+2, i.e. two cycles later than the "subblock input" process.

From the above, it becomes clear that the flexible rate matching process minimizes the delay as measured for instance in terms of the time difference between the input of the first subblock and the output of the last (or first) subblock. The skilled person will also appreciate that the input, the rate-matching, and the output rely on concurrent software processes and/or independently operating hardware.

In the following, the processes "subblock input", "subblock rate-matching", and "subblock output" will be explained in more detail with respect to FIGS. 7-9. These explanations also refer to the parameters and definitions as described above with respect to equations (3) to (6). In particular, any reference to a clock event, such as for example "[clk 5]" or "[clk i]", in any of the FIGS. 6 to 9, does refer to the same clock event of the common clock signal, namely the fifth and the i-th, respectively. In order to distinguish between operations and/or steps which are executed at a particular clock event and those which may be executed at any point in time (for example in between clock events), clocked operations are marked with expressions such as "[clk i]" in the flow charts of FIGS. 7 to 9.

Figure 7:
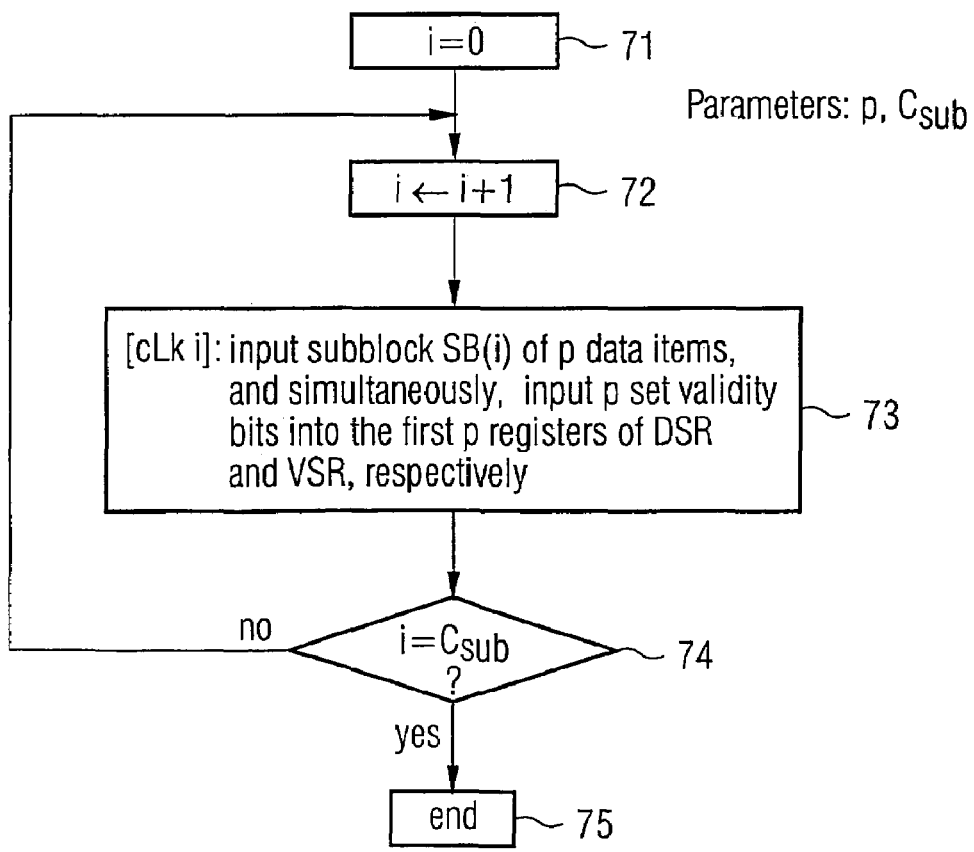
FIG. 7: Flow chart of the (sub)process "subblock input" according to the present invention.
Figure 8:
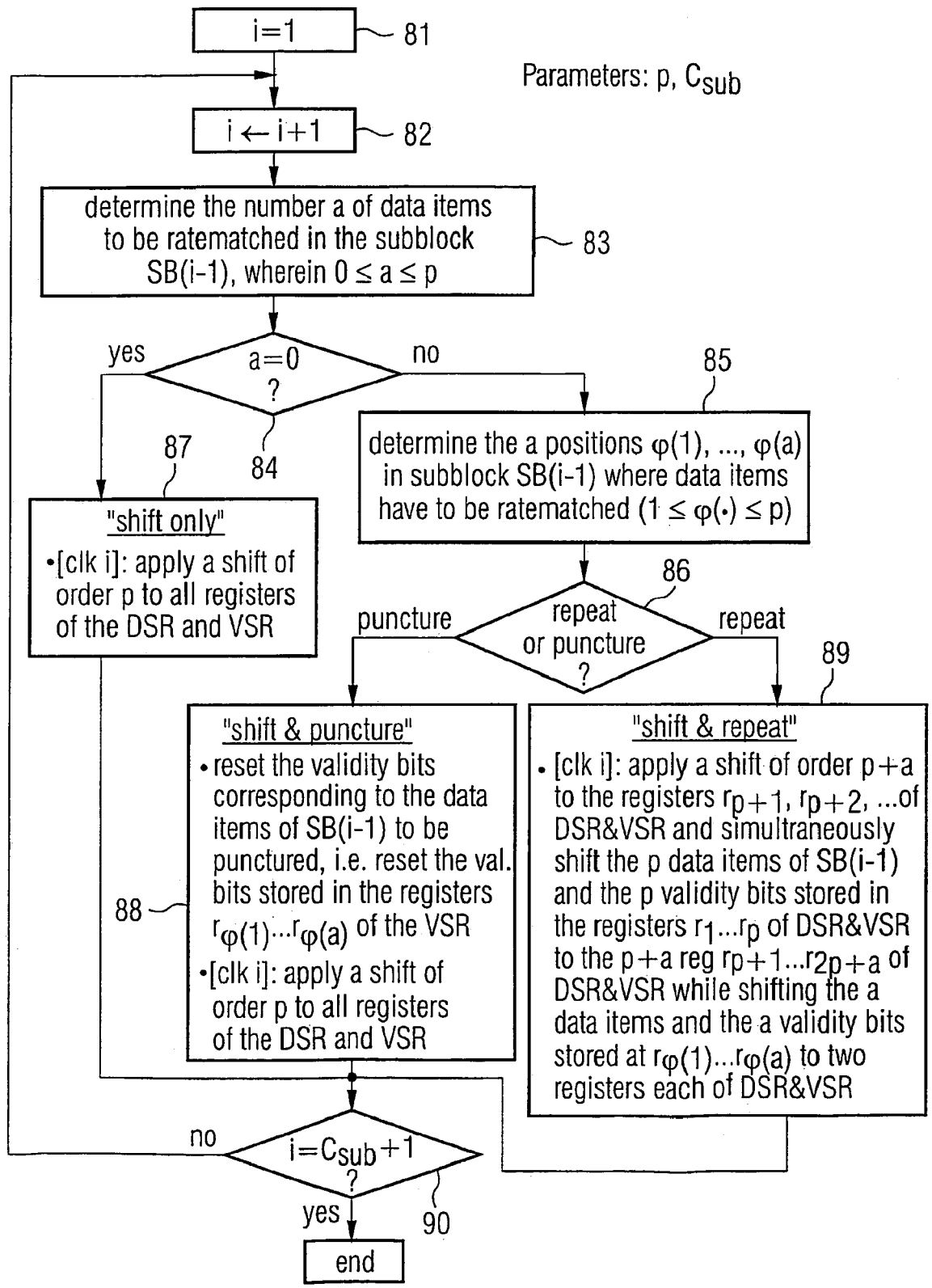
FIG. 8: Flow chart of the (sub)process "subblock rate-matching" according to the present invention.
Figure 9:
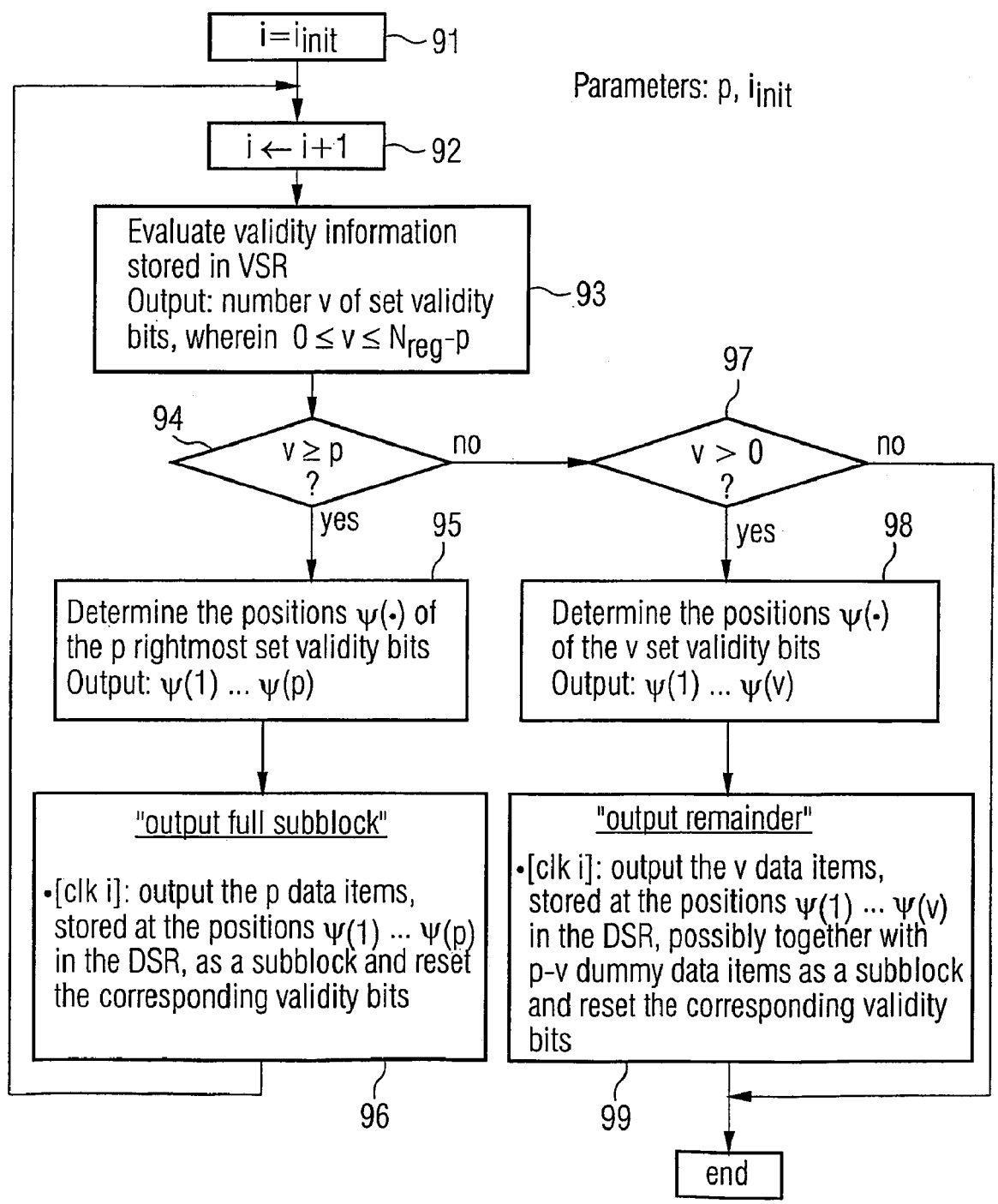
FIG. 9: Flow chart of the (sub)process "subblock output" according to the present invention.

For the description of FIGS. 7-9, an assumption and a definition relating to shift registers must be given. As stated above with respect to FIG. 4, a shift register includes a plurality of memory locations (registers), wherein data is shifted from registers to other registers at a given clock rate. In a programmable/configurable shift register, it can be programmed/configured, which output (i.e. the output of which register among a plurality of possible registers) is to be connected to the input of a given other register. In this way, it is possible, for example, that an output of a given register is connected to the inputs of several other registers. In the following, it is assumed that the registers (memory locations) are ordered in some way, for example by assigning an index j=1, 2, 3, . . . to each register so that the first, second, . . . , and j-th register can be denoted $r_1, r_2, \ldots$, and $r_j$, respectively.

On this assumption, the expression of a higher order shift (operation), also referred to as a shift (operation) "of order s" or "of width s" can be defined as a shift from register $r_j$ to the register $r_{j+s}$. A first order shift (i.e. a shift of order/width one) thus corresponds to a shift from register $r_j$ to the next/subsequent (in terms of its index) register $r_{j+1}$. In the following, it is assumed that both the data shift register (DSR) and the validity shift register (VSR) are capable of performing such higher order shift operations in a single period of the common clock signal and in a configurable/programmable way as described above.

FIG. 7 shows a flow chart of the "subblock input" process. In a first step 71, a clock event counter i is initialized to an initialization value such as zero. Furthermore, the data shift register (DSR) and the validity shift register (VSR) are reset (not shown in step 71). Then, in step 72, the clock event counter i is incremented by one. In step 73, executed with the i-th clock event ("[clk i]"), the i-th subblock (denoted SB(i) in the following) of p>0 data items and another subblock of p set validity bits are input simultaneously into the first p registers (memory locations) of the DSR and VSR, respectively. Then, in step 74, the value of the clock event counter i is compared with $C_{Sub}$ as defined in equation (3). If the value of i is equal to $C_{Sub}$, i.e. when a total of $C_{Sub}$ subblocks has been input into the DSR, the "subblock input" process terminates ("step" 75). Otherwise, the sequence of steps 72, 73 and 74 is repeated, i.e. the clock event counter is further incremented in step 72 in order to input, with the next clock event, the next subblock of data items in step 73, and then to again compare the increased value of i with $C_{Sub}$. This sequence of steps is repeated until it is determined in step 74, that the clock event counter has reached the value of $C_{Sub}$.

For the following description of the FIGS. 8 and 9, it is assumed that at subsequent clock events [clk i] with i>$C_{Sub}$, i.e. after termination of the "subblock input" process, dummy subblocks with arbitrary or dummy data items are input together with reset validity bits.

FIG. 8 shows a flow chart of the "subblock rate-matching" process. As this process starts its operations one clock event after the "subblock input" process has started its operations (cf. FIG. 6), the clock event counter i is initialized to a value of one, here, in step 81. Upon incrementing the clock event counter i by one in step 82, it is determined in step 83, how many data items of the (i−1)-th subblock, denoted SB(i−1) and stored in the first p>0 registers of the DSR, have to be rate-matched according to the rate matching scheme to be employed (RMS1, RMS2 etc.). Let a denote the number of data items to be rate-matched in said subblock SB(i−1). Note that a is in the range $0 \leq a \leq p$.

In step 84, the value of a is compared with zero. If a=0, i.e. in case no rate-matching has to be applied to the subblock SB(i−1) stored in the first p registers of the DSR, only shift operations are executed with the i-th clock event ("[clk i]"), as shown in step 87, wherein a shift of order p as defined above is applied to all registers of the DSR and VSR. As the skilled person will appreciate, this implies that the contents of the last p registers of the DSR (and also of the VSR) will be lost upon execution of this operation. However, the process "subblock output" will ensure that valid data items are output before this can happen, as will be described with respect to FIG. 9.

If it was determined in step 84, that a is not equal to zero, i.e. at least one data item has to be rate-matched in subblock SB(i−1), it can be stated that there are a positions in subblock SB(i−1) where data items have to be rate-matched. These a positions, denoted $\phi(1), \phi(2), \ldots, \phi(a)$ and depending on the rate matching scheme to be employed, are determined in step 85. Then, it is determined in step 86 whether the data items stored at said positions $\phi(1), \ldots, \phi(a)$ of subblock SB(i−1) have to be punctured or repeated. In case of puncturing, shift and puncturing operations will be performed in step 88, while in the repetition case, shift and repetition operations will be performed in step 89.

In case of puncturing (step 88), the validity bits associated to those data items of SB(i−1) which need to be punctured, i.e. the validity bits stored at said positions $\phi(1), \ldots, \phi(a)$ of the subblock of validity bits associated to the subblock SB(i−1) of data items, are reset. At a later stage, these reset validity bits will indicate to the process "subblock output" that the corresponding data items are not to be output, as will be seen from the description with respect to FIG. 9 below. Upon resetting said validity bits, a shift of order p will be applied, with the i-th clock event ("[clk i]"), to all registers of the DSR and VSR, just as in step 87.

In the repetition case (step 89), with the i-th clock event ("[clk i]"), a shift of order p+a will be applied to a second part of the dual shift register (both DSR and VSR) in order to prevent the contents stored in said second part to be overwritten by the shift and repetition operations applied at the same time ("[clk i]") to a first part of the dual shift register (both DSR and VSR). More precisely, said first part of the dual shift register comprises the first p registers of the DSR, where subblock SB(i−1) is stored, and also the first p registers of the VSR, where the associated validity bits are stored, cf. step 73 of FIG. 7. Said second part of the dual shift register comprises the remaining registers of both DSR and VSR, where preceeding subblocks of data items which have already been rate-matched, and associated validity bits are stored. In order to achieve a repetition of the a data items stored at the positions $\phi(1), \ldots, \phi(a)$ of subblock SB(i−1), the p data items of subblock SB(i−1) and the associated p validity bits, i.e. the 2p items stored in said first part of the dual shift register, are shifted, with the i-th clock event ("[clk i]"), to the first 2(p+a) registers of said second part of the dual shift register while repeating, i.e. shifting to two registers each, those a data items and those a associated validity bits stored at said positions $\phi(1), \ldots, \phi(a)$ in the first parts of the DSR and VSR, respectively.

Upon execution of one of the steps 87-89, the value of the clock event counter i is compared with $C_{Sub}+1$ in step 90, wherein the "+1" in the latter expression is due to the init value of one assigned to the clock event counter in step 81. If i is equal to $C_{Sub}+1$, all $C_{Sub}$ subblocks input by the "subblock input" process described above with respect to FIG. 7 have been processed in one of the steps 87-89 and are thus ready for output, so that the "subblock rate-matching" process can be terminated. Otherwise, if i is inferior to $C_{Sub}+1$, the process continues with step 82 etc.

As the skilled person will readily appreciate, steps other than the steps 83-86 described above can easily be conceived in order to perform step 87 when neither repetition nor puncturing operations are required for the subblock under consideration (SB(i−1)), or to perform step 88 or 89 when puncturing and repetition operations are required, respectively, for said subblock. For example, instead of the steps 83-86 as described above, it could be attempted in a first step to directly determine positions where data items in subblock SB(i−1) have to be rate-matched. In a second step, it would then have to be branched into step 87, if no such positions were found, and into step 88 or 89, if at least one position was found in said first step, where a data item needs to be punctured or repeated, respectively.

From the above description of the steps 87-89, it can be concluded that shift operations of order p are applied to all registers of the dual shift register, whenever no data item of the subblock under consideration (SB(i−1)) needs to be repeated, i.e. whenever one of the steps 87 and 88 is executed. In contrast, shift operations of order p+a are applied to the second part of the dual shift register and shift operations of an order in between p and p+a are applied to the first part thereof, whenever said subblock SB(i−1) does require a number a>0 of its data items to be repeated in step 89. Given the fact that, in step 89, a lies in the range of $1 \leq a \leq p$, this implies that the dual shift register must be capable of performing shift operations of orders ranging from p (minimum order) to 2 p (maximum order) in a programmable/configurable manner. As the value of a and the positions $\phi(1), \ldots, \phi(a)$ may (and will in general) change from subblock to subblock, it may be necessary to reconfigure/reprogram the dual shift register from clock event to clock event. This will also be seen from the detailed description of the steps 87-89 provided below with respect to FIG. 12.

FIG. 9 shows a flow chart of the "subblock output" process. In a first step 91, a clock event counter i is initialized to an initialization value $i_{init}$. This initialization value is equal to 2 in the repetition case and equal to $2+C_{Sub}-M_{Sub}$ in the case of puncturing, if it is desired to start the output of subblocks at the earliest possible clock event which is [clk $i_{init}+1$], as can be seen from FIG. 6. Thereafter, in step 92, the clock event counter i is incremented by one. Then, in step 93, the validity information stored in the VSR is evaluated. In particular, the number v of set validity bits in all but the first p registers of the VSR is determined.

In step 94, said number v is compared with p, the order of parallelization, or equivalently, the number of data items per subblock. If it is determined that said number v is superior or equal to p, the positions $\psi(1), \psi(2), \ldots, \psi(p)$ of the p rightmost (i.e. last) set validity bits stored in the VSR are determined in step 95. Note that due to puncturing not necessarily said positions will refer to adjacent registers of the VSR. In step 96, executed with the i-th clock event ("[clk i]"), the p (valid) data items corresponding to said p rightmost set validity bits, i.e. the p data items stored at the positions $\psi(1), \ldots, \psi(p)$ of the DSR, are output as a (full) subblock while the associated validity bits are reset as an indication that the corresponding data items have been output. Then, the sequence of said steps 92-96, i.e. incrementing the clock event counter (step 92), determining the number v of set validity bits (step 93), comparing v with p (step 94) and, if $v \geq p$, determining the positions of the p rightmost (last) set validity bits (step 95) and outputting the corresponding valid data items while resetting the associated validity bits (step 96), is repeated until it is determined in step 94 that v is inferior to p. In this case, it is no longer possible to output a full subblock of valid data items.

Then, in step 97, v is compared with zero. If v is equal to zero, the "subblock output" process terminates. Otherwise, i.e. if v is in the range $1 \leq v \leq p-1$, the process continues with step 98, where the positions $\psi(1), \psi(2), \ldots, \psi(v)$ of the final v set validity bits stored in the VSR are determined. In step 99, executed with the i-th clock event ("[clk i]"), the v (valid) data items corresponding to said v set validity bits, i.e. the v data items stored at the positions $\psi(1), \ldots, \psi(v)$ of the DSR, are output as a partial subblock, possibly together with p−v dummy data items in order to form a full subblock comprising p items, while the associated validity bits may be reset. Thereafter, the "subblock output" process terminates.

As the skilled person will readily appreciate, steps other than the steps 93, 94, 95, 97, 98 described above can easily be conceived in order to perform step 96 as long as p set validity bits can be found, or to perform step 99 if $1 \leq v \leq p-1$ set validity bits are found. For example, instead of the steps 93, 94, 95, 97, and 98 as described above, it could be attempted in a first step to directly determine the positions of the p rightmost set validity bits. In a second step, it would then have to be branched into step 96, if p positions could be determined in the first step, and into step 99, if at least one position was found in said first step, respectively.

Moreover, steps 96 and 99 could be merged into a combined step capable of outputting a number of valid data items equal to the number ($\leq p$) of positions determined in said first step. In this case, instead of the two comparisons in steps 94 and 97, a single check whether at least one position was found, would suffice.

Furthermore, as the skilled person will readily appreciate, other loop structures and/or criteria for terminating the "subblock output" process can easily be conceived. For example, the "subblock output" process could be terminated once a total of $M_{Sub}$ subblocks according to eq. (4) has been output. This will be the case just after the clock event [clk $i_{init}+M_{Sub}$].

According to the above description with respect to FIGS. 6 to 9, both the input of subblocks to the DSR and the output of possibly modified (rate-matched) subblocks therefrom are executed at the same (common) clock rate. The "subblock output" process operates continuously and concurrently (simultaneously) to the "subblock input" process as soon as the respective start condition [clk $i_{init}+1$] is met and as long as valid data items are found in the DSR. It is this interleaved input and output processing that allows for a minimization of hardware complexity, where only a small set of subblocks must be maintained in the DSR. Also, through the parallelized input and output processing, extremely high data rates necessary for future 3G applications can be dealt with using, e.g., FPGA or ASIC technology.

Another important advantage of the present invention is the significantly improved flexibility with regard to different rate matching schemes. This is achieved by using only a single hardware structure (to be detailed below) irrespective of the question how the positions of the data items to be rate-matched are specified (and thus determined) and irrespective of the variety of transport channel types and sizes C of coded data blocks.

While in the above, with respect to FIGS. 4 to 9, concepts and principles of the invention have been illustrated with respect to an algorithmic representation thereof, in the following, options to implement the invention in hardware (and/or software) will be discussed with respect to FIGS. 10 to 18.

Figure 10:
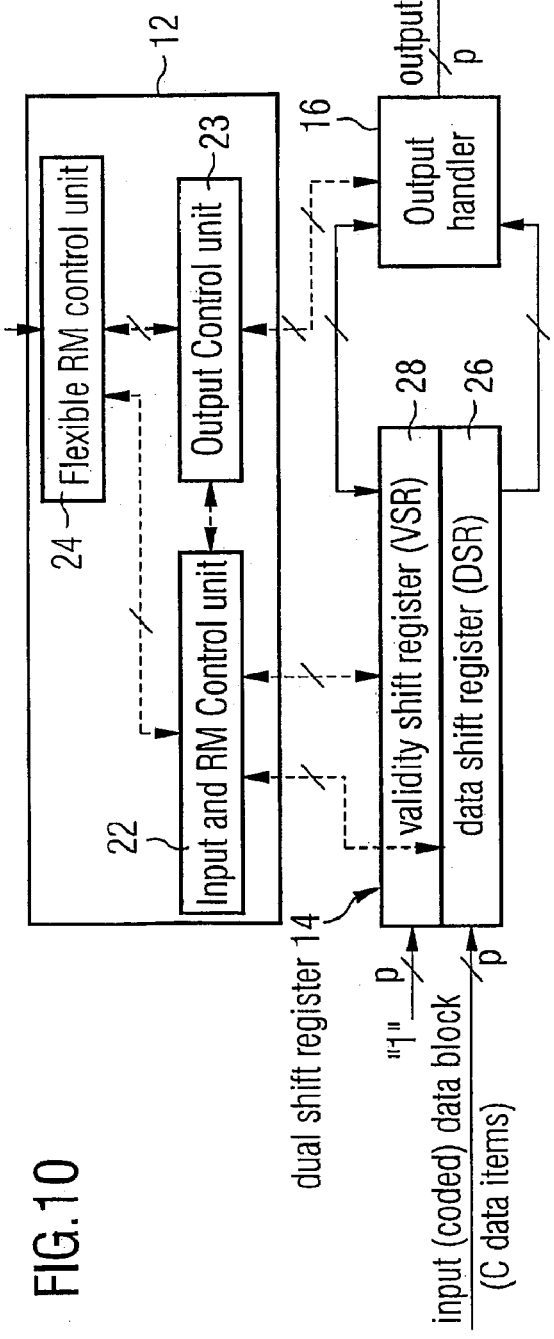
FIG. 10: Block diagram of a first flexible rate matching apparatus according to the present invention.

FIG. 10 shows a block diagram of a flexible rate matching apparatus according to the present invention. It includes a dual shift register 14, an output handler 16, and a control unit 12. The dual shift register 14 is composed of a configurable data shift register (DSR) 26 and a configurable validity shift register (VSR) 28.

Operatively, in the flexible rate matching apparatus, the dual shift register 14 and the output handler 16 are operated by the control unit 12 such that data items of an input data block are input into the DSR 26, shifted and modified (rate-matched, i.e. repeated or punctured) therein (together with the associated validity bits in the VSR) and finally output as a part of a rate-matched data block, wherein all these operations are performed according to the flexible rate matching approach as described above. Heretofore, the DSR 26 is adapted to receive a continuous stream of data items (or subblocks thereof each comprising $p \geq 1$ data items) at a prespecified clock rate. To each data item there is assigned a validity bit as described above. The validity bits (or subblocks thereof each comprising $p \geq 1$ validity bits) are stored in the VSR 28 and shifted (moved) therein at the same prespecified clock rate. Further, the output handler 16 is adapted to continuously output valid data items (or subblocks thereof each comprising $p \geq 1$ valid data items) at the same prespecified clock rate using the validity information stored in the VSR 28 as masking information. The control signals applied by the control unit 12 to the dual shift register 14 and the output handler 16 include configuration parameters/data required for an appropriate configuration/programming of the dual shift register 14 and/or the output handler 16 as well as clock/shift enable signals, set and/or reset signals, timing signals etc.

For example, as shown in FIG. 10, the control unit 12 includes an "input and RM control unit" 22 (RM: rate matching), an "output control unit" 23, and a "flexible RM control unit" 24. Herein, the execution of the "subblock input" and "subblock rate-matching" processes described above with respect to FIGS. 7 and 8 could be controlled by the input and RM control unit 22 while the execution of the "subblock output" process described above with respect to FIG. 9 could be controlled by the output control unit 23. The flexible RM control unit 24 can take over the coordination of the control (sub)units 22 and 23. This implies a synchronization of their operations, i.e. of the steps of said three processes in the sense of the above description with respect to FIGS. 6-9, as well as a coordination of the exchange of information therebetween.

For example, the rate matching scheme(s) specified by the standard(s) according to which the telecommunication system is to operate (cf. the example schemes RMS1, RMS2 etc. described above with respect to the prior art) could be evaluated by the flexible RM control unit 24 or in a separate computation unit (not shown) under control of the flexible RM control unit 24 in dependence of one or several parameters supplied to said flexible RM control unit 24 (said parameters identifying for example a particular rate matching scheme to be used). The resulting positions, where data items have to be rate-matched could then be supplied to the input and RM control unit 22 for use in, e.g., steps 83 and 85 of FIG. 8, or alternatively stored in a position memory (not shown) to be accessed by the input and RM control unit 22. Note that the determination of said positions (as well as their storage, if applicable) can be done data block wise (i.e. once for all subblocks part of the input data block) prior to the flexible rate matching process itself or subblock-wise (i.e. from subblock to subblock) concurrently to the flexible rate matching process itself.

The arrangement of components of the control unit 12 shown in FIG. 10 can easily be modified. For example, the input and RM control unit 22 could be split into two control (sub)units, one input control (sub)unit for controlling the "subblock input" process only, and one RM control (sub)unit for controlling the "subblock rate-matching" process only. In this case, the flexible RM control unit 24 would have to coordinate a total of three control (sub)units.

On the other hand, the output control unit 23 could be part of the output handler 16 and/or said input control (sub)unit could be part of the dual shift register 14. In this case, the flexible RM control unit 24 would directly control the dual shift register 14 and/or the output handler 16 with respect to the input and output of data items which said RM control (sub)unit would control the rate-matching operations themselves.

Also, the computation unit mentioned above as well as the position memory (both not shown in FIG. 10) could be combined into the input and RM control unit 22 or said RM control (sub)unit.

Further, while the different functional subunits of the control unit 12 are shown as dedicated and separated units, the implementation thereof may as well be based on a standard controller, microcomputer, microprocessor or digital signal processor suitably programmed so as to execute the described steps. Another option would be to use FPGA or ASIC hardware designed through VHDL code, e.g.

Figure 11:
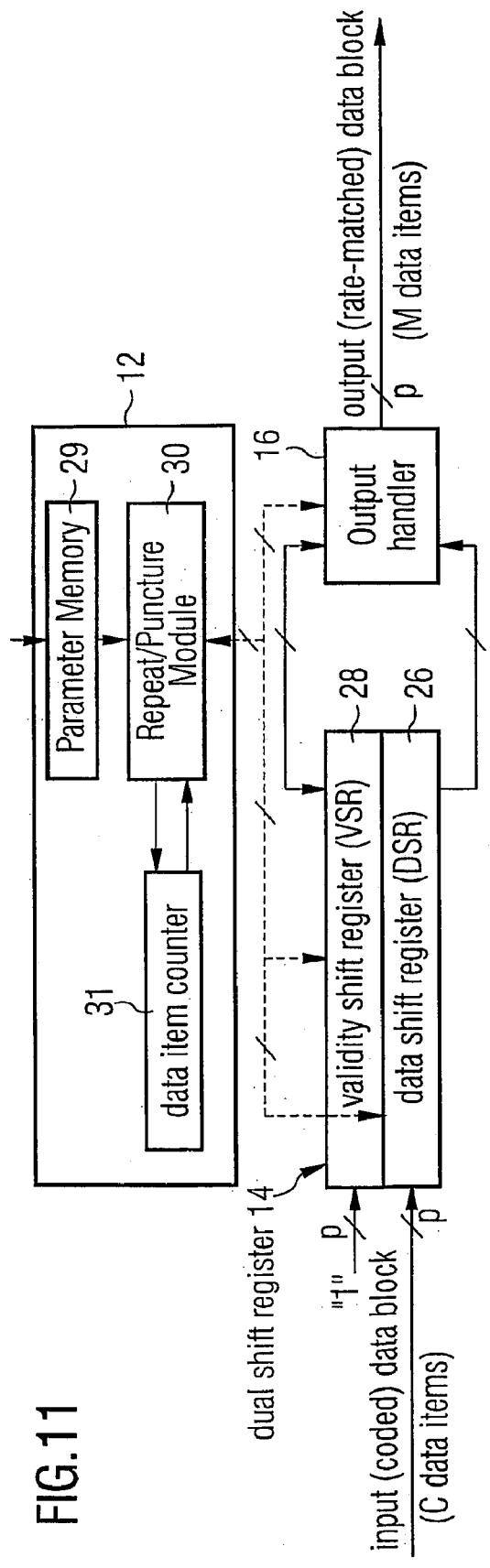
FIG. 11: Block diagram of a second flexible rate matching apparatus according to the present invention.

FIG. 11 shows a block diagram of a second flexible rate matching apparatus according to the present invention. Elements identical to those discussed above with respect to FIG. 10 are identified by the same reference numerals and the explanation thereof will be omitted. According to the second embodiment of the present invention, the control unit 12 comprises a parameter memory 29, a data item counter 31 and a repeat/puncture module 30.

Operatively, the parameter memory 29 stores at least one parameter associated with the rate matching scheme(s) to be employed. Examples for such parameters include positions of data items to be rate-matched or distances therebetween, as described above with respect to the prior art (RMS1, RMS2, . . . ). The data item counter 31 counts all incoming data items. In case the counter value reaches a trigger value derived from the stored parameter(s), this is an indication to repeat/puncture the data item. Typically, the determination of the trigger value as well as the comparison of the counter value with the trigger value is carried out by the repeat/puncture module 30, wherein for p>1, a total of p comparisons has to be performed simultaneously. In case the compared values are identical, the repeat/puncture module 30 either resets the validity bits of the corresponding data items in case of puncturing or initiates double shifts in the dual shift register 14 together with the repetitions themselves in case of repetition. The repeat/puncture module 30 may coordinate the operations of the other components of the control unit 12 and further of the dual shift register 14 and the output handler 16.

In the following, shift, repeat and puncture operations in the dual shift register will be explained in more detail with respect to FIG. 12, wherein an exemplary configurable data shift register (DSR) and an exemplary configurable validity shift register (VSR), each comprising $N_{reg}=15$ memory locations (registers), are shown. Herein, small square boxes bearing an index j=1, 2, 3, . . . represent the j-th register (register $r_j$) of the DSR and the VSR, respectively, as can be seen from the legend of FIG. 12. The parallelization order p, i.e. the number of data items per subblock, is assumed to be p=3 while of course other values $p \geq 1$ are possible.

It is assumed in FIG. 12 that the subblock under consideration, denoted SB(i) and comprising p=3 data items, is stored in the first p=3 registers $r_1$, $r_2$, $r_3$ of the DSR with the associated validity bits stored in the first p=3 registers of the VSR, while previously input subblocks of data items and their associated validity bits are stored in the other registers of the DSR and VSR, respectively. Arrows are used in FIG. 12 to indicate the shift operations to be executed at the next event of the common clock signal ([clk i+1]). It should be noted that in FIG. 12, the registers are arranged in the DSR and the VSR such that the shift operations can easily be indicated by straight arrows. Other than that there is no meaning to the placement of a particular register in the DSR/VSR.

Figure 12A:
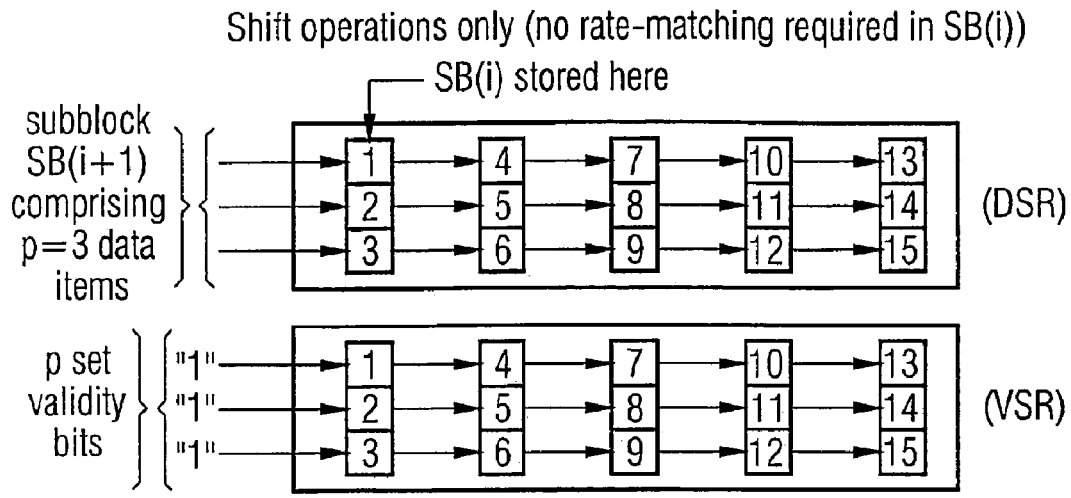
FIG. 12: Block diagram of an exemplary configurable dual shift register illustrating shift, repetition, and puncturing operations according to the present invention.
Figure 12B:
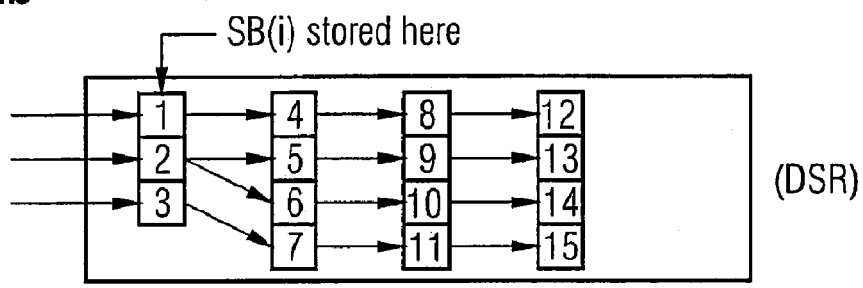
Figure 12C:
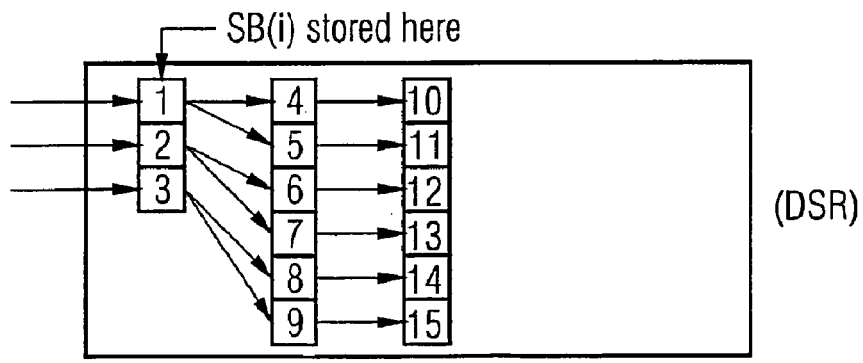

While FIG. 12*a* relates to the case in which only shift operations need to be executed (cf. step 87 of FIG. 8), FIGS. 12*b* and 12*c* are devoted to the situation wherein a number a of data items of the subblock SB(i) need to be repeated (cf. step 89 of FIG. 8) with a=1 for FIG. 12*b* and a=p=3 for FIG. 12*c*.

In FIG. 12*a*, it is assumed that no rate-matching is necessary for the subblock SB(i) so that only shift operations are to be executed. It can be seen that a shift of order p=3 is to be applied to all registers of the DSR and the VSR at the next clock event, as described above with respect to step 87 of FIG. 8. All data items stored in the DSR as well as all validity bits stored in the VSR will then be shifted p=3 registers "to the right" (wherein expressions such as "to the right" and "to the left" are intended to mean "to higher register indices j" and "to lower register indices j", respectively). For example, the subblock SB(i) and its associated validity bits will then be stored in the registers $r_4$, $r_5$, $r_6$ of the DSR and VSR, respectively. Simultaneously, the next subblock SB(i+1) of p=3 data items and an associated subblock of p=3 set validity bits is input into the first p=3 registers $r_1$, $r_2$, $r_3$ of the DSR and VSR, respectively, as indicated in FIG. 12*a* (cf. step 73 of FIG. 7). Note that in principle, FIG. 12*a* also applies to the case in which a number a of data items has to be punctured from the subblock SB(i). If, for example, the data item stored in register $r_2$ of the DSR is to be punctured, its associated validity bit, i.e. the validity bit stored in the register $r_2$ of the VSR must be reset prior to the illustrated shift operations executed at the next clock event, as described above with respect to step 88 of FIG. 8. Alternatively, if resetting is done after said next clock event, the (same) validity bit (then) stored in $r_5$ of the VSR has to be reset.

FIG. 12*b* relates to the case in which a single (a=1) data item of the subblock SB(i) has to be repeated, namely the second data item stored in the register $r_2$ of the DSR. As noted above, the registers are arranged in a different manner (compared with FIG. 12*a*) in order to facilitate the illustration of the shift operations. As can be seen from FIG. 12*b*, at the next clock event, the data item stored in the register $r_1$ of the DSR will be shifted to register $r_4$ (just as in FIG. 12*a*) while the data item stored in $r_2$ will be shifted to $r_5$ and $r_6$ and thus will be repeated. The data item stored in $r_3$ will be shifted to $r_7$ while shifts of order p+a=4 are to be applied to the remaining registers $r_4$, $r_5$, . . . . Since the shift operations applied to the VSR are always the same as those applied to the DSR, the illustration of the VSR is omitted in FIG. 12*b* (and also in FIG. 12*c*). The validity bits are thus shifted and repeated in an analoguous manner.

In FIG. 12*c*, it is assumed that all p data items of the subblock SB(i) have to be repeated (a=p=3). At the next clock event, the data items stored in registers $r_1$, $r_2$, and $r_3$ will therefore be shifted (and repeated) to the registers $r_4$ & $r_5$, $r_6$ & $r_7$, and $r_8$ & $r_9$, respectively, while shifts of order p+a=6 are to be applied to the registers $r_4$, $r_5$, . . . . Again, an analoguous picture applies to the VSR.

A note on the total number $N_{reg}$ of registers appears to be in order, here. The DSR must be able to store $|A_{Sub}|$ subblocks [see eq. (5)], i.e. $p*|A_{Sub}|$ data items, in order to prevent both an underflow in case of puncturing (leading to an interruption of the otherwise continuous stream of output subblocks) and an overflow in case of repetition (leading to a loss of valid data items). In addition, a further p registers must be provided for storing the newly incoming (and not yet rate-matched) subblock. The minimum total number of registers required for each shift register (DSR and VSR) thus amounts to $$N_{reg} = p*|A_{Sub}| + p = p*(|A_{Sub}|+1). \quad (8)$$

Given the values of p=3 and $N_{reg}$=15, the exemplary shift registers shown in FIG. 12 would thus be sufficient for a flexible rate matching apparatus with $|A_{Sub}|=|M_{Sub}-C_{Sub}|=4$.

From the above description with respect to FIG. 12, it is obvious that the connections between registers must be configurable/programmable in both the DSR and the VSR. For an implementation of such configurable/programmable shift registers, it is necessary to determine which minimum shift order and which maximum shift order needs to be supported for each register under consideration. Such limits for the orders of shift operations will be derived in the following.

From FIGS. 12b and 12c, it can be generalized that when $1 \leq a \leq p$ data items of the subblock SB(i) have to be repeated, shift operations of order p+a are to be applied to the registers $r_{p+1}, r_{p+2}, \ldots$, and one or two different shift operations (with orders in between p and p+a) have to be applied to the first p registers $r_1, r_2, \ldots, r_p$. This confirms the above description with respect to step 89 of FIG. 8. Since at most a=p data items have to be repeated, the maximum order of shift operations necessary to be implemented amounts to 2p for the registers $r_{p+1}, r_{p+2}, \ldots$, and p+j for the first p registers $r_j$ with j=1, 2, ..., p.

The minimum order of shift operations can be determined from the shift-only and shift&puncture cases described above with respect to FIG. 12a. Accordingly, the minimum order of shift operations necessary to be implemented amounts to p for all registers.

It can therefore be concluded that the registers of both the DSR and the VSR must be able to perform, in each cycle of the common clock signal and in a configurable/programmable manner, higher order shift operations with shift orders in the following ranges:

$$r_j \text{ with } j \leq p: \text{shift orders in the range } p, \ldots, p+j \quad (7a)$$

$$r_j \text{ with } j > p: \text{shift orders in the range } p, \ldots, 2p. \quad (7b)$$

Figure 13:
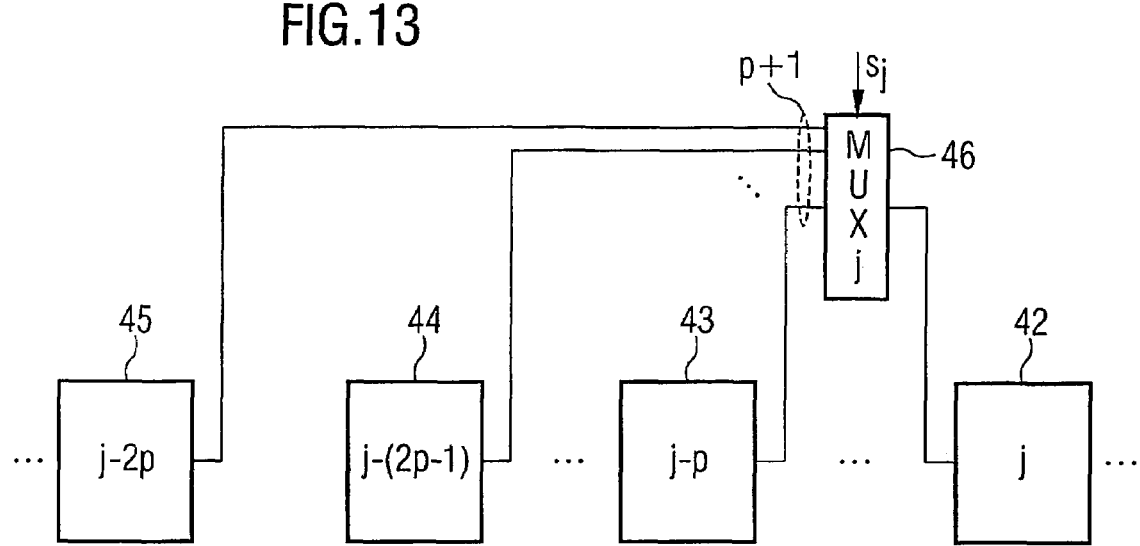
FIG. 13: Block diagram of an exemplary implementation of a part of a configurable shift register capable of performing higher order shift operations according to the present invention.

FIG. 13 provides an exemplary implementation of a part of a configurable/programmable shift register capable of performing such higher order shift operations. Herein, a single register $r_j$ with reference numeral 42 is considered, wherein j>2p is assumed for the moment. In contrast to the description of FIG. 12 where an output view was given for each register (i.e. where to is the register contents shifted with the next clock event?), for FIG. 13 an input view is chosen for the register $r_j$ in the sense of the question "where from does the register $r_j$ possibly receive data with the next clock event?".

According to equations (7a) and (7b), in general, the shift operations necessary to be supported can have orders ranging from p to 2 p. For this reason, in general, the "destination" register $r_j$ must be adapted to receive data, in a configurable manner, from the p+1 "source" registers $r_{j-2p}, r_{j-(2p-1)}, \ldots, r_{j-(p+1)}, r_{j-p}$. According to FIG. 13, this can for example be achieved by providing a multiplexer MUX-J (46) adapted to selectively connect the output of one of said source registers $r_{j-2p}$ (45), $r_{j-(2p-1)}$ (44) ..., $r_{j-p}$ (43) to the input of said destination register $r_j$ (42). In this arrangement, a configuration parameter $s_j$ is used in order to control said multiplexer MUX-j (46) so as to select the output of the appropriate source register (depending on the desired shift order at the input of said destination register $r_j$).

For an entire configurable shift register comprising $N_{reg}$ registers, an arrangement such as the one shown in FIG. 13 (with a multiplexer MUX-j) is necessary for all registers $r_j$ with j=p+2, p+3, ..., $N_{reg}$ while the first p+1 registers $r_1$, $r_2, \ldots, r_{p+1}$ do not require such an arrangement, because their inputs can be hard-wired either to the p inputs of the shift register (this holds for the destination registers $r_1, \ldots, r_p$) or to the output of the register $r_1$ (this holds for $r_{p+1}$). In summary, a total of $N_{reg}$−(p+1) multiplexers (and thus configuration parameters $s_j$) is thus required for the entire configurable shift register. Herein, the destination registers $r_j$ with j=p+2, ..., 2 p will have to be connected to fewer than p+1 (but at least two) source registers, as the skilled person will readily appreciate.

From the above description with respect to FIGS. 6 to 9, 12 and 13, it is clear that the multiplexers MUX-j of the shift registers (DSR and VSR) must be reconfigured/reprogrammed (by applying different sets of configuration parameters $s_j$ under the control of the control unit 12 of FIGS. 10 and 11) in each cycle of the common clock signal in order to allow for the appropriate shift operations to be performed.

Figure 14:
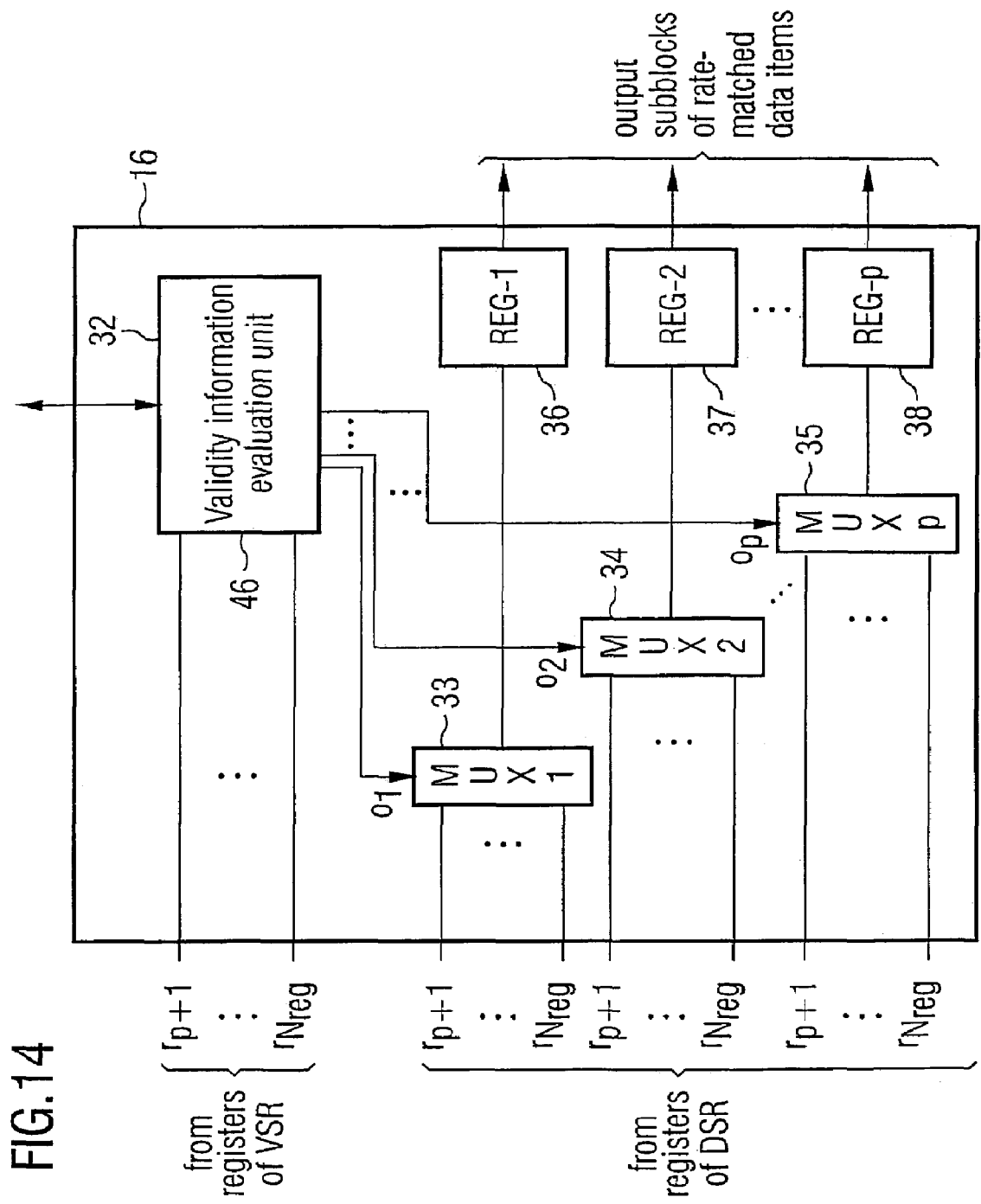
FIG. 14: Block diagram of an output handler according to the present invention.

FIG. 14 provides an exemplary implementation of the output handler 16 as described above with respect to FIGS. 9 to 11. As shown, the output handler includes a validity information evaluation unit 32, p multiplexers (MUX-1, MUX-2, ..., MUX-p) 33, 34, 35, and p output registers (REG-1, REG-2, ..., REG-p) 36, 37, 38, wherein p>0 denotes the order of parallelization. Each multiplexer is connected to the outputs of all but the first p registers of the DSR, while the validity information evaluation unit 32 is connected to the outputs of the corresponding registers of the VSR. Each multiplexer MUX-m with m=1, 2, ..., p is adapted to selectively connect an output of one of said DSR registers to the input of its associated output register REG-m which, with the next event of the common clock signal, will output the data item stored in the selected DSR register. The selective connection established by each multiplexer MUX-m with m=1, 2, ..., p is controlled by a configuration parameters $o_m$ supplied by the validity information evaluation unit 32.

Operatively, the validity information evaluation unit 32 evaluates, under the control of the control unit 12 of FIGS. 10 and 11, the validity information stored in said registers of the VSR (cf. step 93 of FIG. 9). In particular, it determines the positions of the p rightmost (last) set validity bits (cf. step 95) and derives p control parameters $o_m$, m=1, 2, ..., p therefrom. When applied to said multiplexers, these control parameters ensure that the p valid data items stored at said positions in the DSR are forwarded to the p output registers, wherefrom they are output in the form of a subblock with the next event of the common clock signal (step 96). In addition, the validity information evaluation unit 32 controls the multiplexers so as to append dummy data items if less than p positions were found (not shown, cf. step 99) and resets the validity bits associated with output data items (not shown, cf. steps 96 and 99).

As the skilled person will readily appreciate, the validity information evaluation unit 32 can also be part of the control unit 12 shown in FIGS. 10 and 11.

From the above description with respect to FIGS. 6 to 9 and 14, it is clear that the multiplexers MUX-m of the output handler must be reconfigured/reprogrammed (by applying different sets of configuration parameters $o_m$) in each cycle of the common clock signal in order to allow for the output of the appropriate data items.

It is to be noted that according to the description with respect to FIGS. 6, 9-11, and 14, the output handler is capable of delivering a continuous (uninterrupted) stream of subblocks at the rate of the common clock signal, wherein each subblock comprises p rate-matched data items (the last subblock possibly being padded with dummy data items).

Figure 15:
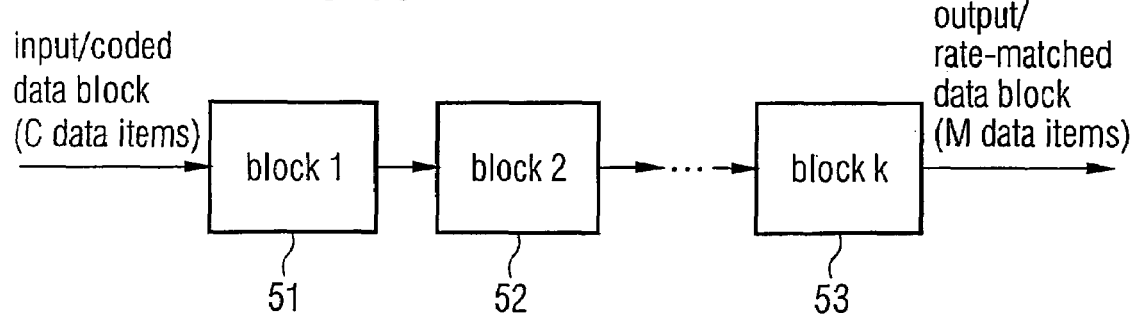
FIG. 15: Cascaded structure of flexible rate matching apparats according to the present invention.

FIG. 15 shows a further embodiment of the flexible rate matching apparatus according to the present invention. This embodiment is characterized by a cascade structure. Herein, a plurality of flexible rate matching blocks 51, 52, 53 is connected in cascade. Each such block may have any structure as previously described with respect to any of the. FIGS. 4 to 14.

The cascading of flexible rate matching blocks allows to realize complex recursive rate matching schemes (as described above with respect to the prior art) through recursively applying any of the flexible rate matching concepts according to the present invention.

A further embodiment of the flexible rate matching apparatus according to the present invention will be described below with respect to FIGS. 16 to 18. This embodiment allows to further reduce implementational complexity while still meeting the other requirements. In fact, the operating speed (clock frequency) can even be increased as a consequence of the reduced complexity.

Figure 16B:
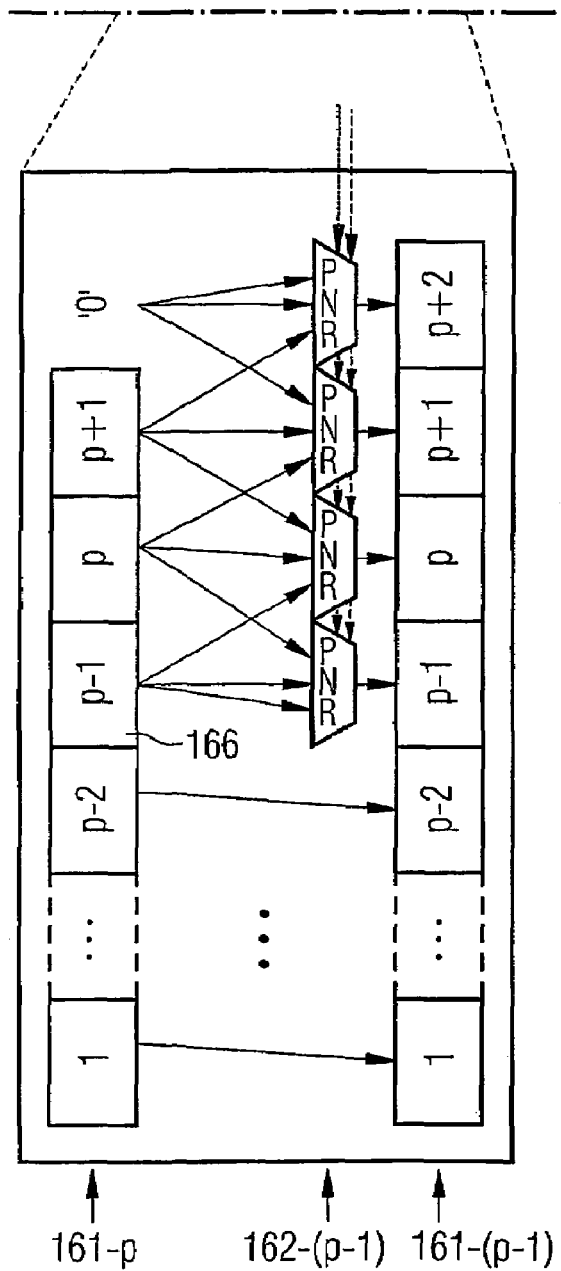
FIG. 16: Block diagram of another exemplary configurable dual shift register together with parts of an exemplary control unit according to the present invention.

FIG. 16 shows a block diagram of an exemplary configurable dual shift register together with parts of an exemplary control unit. Herein, FIG. 16a shows an overview block diagram that can be decomposed into an input section and a certain number of pipeline stages, while FIGS. 16b and c provide detailed views of two exemplary interfaces between adjacent pipeline stages.

In its bottom part, FIG. 16a shows a configurable data shift register (DSR) in accordance with reference numeral 26 of FIG. 10 or 11. As described above with respect to FIGS. 7 and 12a, a subblock comprising p data items is input into the first p registers (164) of the DSR in each cycle of a common clock signal. In general, p can assume any positive integer value, while typical values are 4, 8, 12, 16 etc.

The configurable validity shift register (VSR, see ref. numeral 28 of FIG. 10 or 11) is not shown in FIG. 16a for conciseness reasons. It is assumed to have a structure identical to the one of the DSR. However, rather than data items, a subblock comprising p set validity bits is input into the first p registers of the VSR in each cycle of the common clock signal, as described above with respect to FIGS. 7 and 12a.

In its upper part, FIG. 16a shows parts of an exemplary control unit in accordance with reference numeral 12 of FIG. 10 or 11. These parts, which could for instance be included in the input and RM control unit 22 of FIG. 10 or the repeat/puncture module 30 of FIG. 11, are adapted to generate control signals (indicated by dashed arrows in FIG. 16) suitable for modifying the contents of the DSR and the VSR so as to achieve a rate matching. In each cycle of the common clock signal, a subblock comprising p rate matching flags (RM flags) is input into p registers (165) of said exemplary control unit. Herein, each RM flag is associated with one of the p data items input into the DSR (and thus also with one of the p validity bits input into the VSR); it indicates whether or not the corresponding data item (and validity bit) is to be rate-matched, i.e. repeated or punctured.

As illustrated by the vertical dashed lines in the top part, the block diagram of FIG. 16a can be decomposed into an input section and p pipeline stages. The input section includes p registers 165 (part of the control unit) for storing RM flags, p registers 164 (part of the DSR) for storing data items and p registers (part of the VSR; not shown) for storing validity bits. Each pipeline stage is dedicated to the rate-matching of a particular one of the p data items contained in the subblock input into the DSR as well as to the rate-matching of its associated validity bits. Viewed from the right side to the left side, let the different pipeline stages have the indices 1, 2, ..., p−1, p, as shown in the top part of FIG. 16a. Using this numbering convention (of course, other conventions are possible just as well), it can be stated that the $j^{th}$ pipeline stage is dedicated to the rate-matching of the j data item (of said subblock) stored in the j th register (from the bottom) of the p registers 164, wherein j=1, 2, ..., p. Looking now in the direction of the signal flow, i.e. from left to right, it can thus be stated that first the $p^{th}$ (last) data item of said subblock is rate-matched in stage p (provided it needs to be rate-matched at all), then the $(p-1)^{st}$ data item in stage p−1, if applicable, and so on, until the $1^{st}$ data item is rate-matched in stage 1, if applicable.

As shown in FIG. 16a, each pipeline stage j (wherein j=1, 2, ..., p) includes a set of registers 161-j and a set of multiplexers 162-j connected to said set of registers, wherein both sets are part of the DSR. Each pipeline stage j further includes additional (such) sets of registers and multiplexers as part of the VSR (not shown). From stage 2 onwards, each stage j=2, 3, ..., p further includes an additional set of registers 163-j which is part of the control unit.

In the DSR, the outputs of the p registers 164 of the input section are connected either directly or via the set of multiplexers 162-p (of stage p) to the inputs of the set of registers 161-p of stage p. Likewise, the outputs of the set of registers 161-j of stage j (wherein j=p, p−1, ..., 2) are connected either directly or via the set of multiplexers 162-(j−1) (of stage j—1) to the inputs of the set of registers 161-(j−1) of the "subsequent" stage j−1, as will be shown below in more detail with respect to FIGS. 16b and 16c. Also, the sizes of the sets of registers 161-j in the DSR (and thus in the VSR) increase by one when the stage index j is decreased by one. While stage p contains p+1 DSR registers 161-p, stage p−1 contains p+2 DSR registers 161-(p−1), and so on, down to stage 1 which contains p+p=2*p DSR registers 161-1.

In the control unit, the inputs of the set of registers 163-p of stage p are connected to outputs of the registers 165 of the input section, while the inputs of the set of registers 163-j of stage j (wherein j=p−1, p−2, ..., 2) are connected to outputs of the set of registers 163-(j+1) of the "preceding" stage j+1, as will be shown below in more detail with respect to FIG. 17. Also, the sizes of the sets of registers 163-j in the control unit decrease by one when the pipeline stage index j is decreased by one. While stage p contains p−1 registers 163-p, stage p−1 contains p−2 registers 163-(p−1), and so on, down to stage 2 containing a single register 163-2. It is interesting to note that each stage comprises the same total number of registers in the control unit and the DSR, namely 2*p registers. In particular, in stage j=1, 2, ..., p, the control unit comprises j−1 registers in the set 163-j while the DSR comprises the remaining 2*p−(j−1) registers in the set 161-j. Of course, the VSR adds another 2*p−(j−1) registers in stage j.

Each set of multiplexers 162-j with j=1, 2, ..., p (of both DSR and VSR) is controlled by two control signals (dashed arrows) generated by the control unit.

The first control signal, denoted "RM mode" in FIG. 16a, indicates whether repetition or puncturing operations are to be performed for a given data block if applicable for a given data item of said data block. The RM mode signal therefore is applied to all sets of multi-plexers 162-1, 162-2, ..., 162-p, including those of the VSR.

The second control signal is derived from the RM flags indicating, for each of the p data items, whether or not the respective data item (and the associated validity bit) needs to be rate-matched. For this purpose, a second control input of the set of multiplexers 162-p of stage p is connected with one of the p registers 165 of the control unit's input section, while a second control input of the set of multiplexers 162-j of stage j (wherein j=p−1, p−2, . . . , 1) is connected with one register of the set of registers 163-(j+1) of the preceding stage j+1, as will be described below in more detail with respect to FIG. 17. It is to be noted that, in each stage, the control inputs of the DSR and VSR multiplexers are connected to the same pair of control signals.

FIG. 16b provides a detailed view of the left dashed frame depicted in FIG. 16a. In other words, FIG. 16b shows the interface between the pipeline stages p and p−1 of the DSR, although it also applies to the respective interface of the VSR. On the left side of FIG. 16b, the set 161-p of p+1 registers part of pipeline stage p can be seen, while on the right side, the set 161-(p−1) of p+2 registers part of stage p−1 are shown. Herein, each register is marked with its index. The block diagram of FIG. 16b will be used in the following in order to illustrate the connections between the registers of stages p and p−1 necessary for the rate matching of the data item stored in the register p−1 of stage p, i.e. in register 166.

Herein, the first (lower) p−2 registers of both stages are directly connected with each other, i.e. register 1, 2, . . . , p−2 of pipeline stage p with register 1, 2, . . . , p−2, respectively, of stage p−1. However, this does not apply to the remaining (upper) registers. With the help of four multiplexers 162-(p−1), which are all controlled by the same control signals, the input of each of the registers p−1, p, p+1, p+2 of stage p−1 can be connected to one of the outputs of the registers p−1, p, and p+1 of stage p, and '0', depending on the values of the two control signals supplied by the control unit according to FIG. 16a. Thereby, it is determined whether, at the next clock event, the data item stored in register 166 will be copied to two (repetition), one (no rate matching) or zero (puncturing) destination registers of the subsequent stage p−1.

For example, if the associated RM flag indicates that no rate matching is required for the data item stored in register 166, the multiplexers 162-(p−1) connect their outputs with the inputs designated with "N" (standing for NO rate matching), independent from the value of the RM mode signal. This is to say that the registers p−1, p, and p+1 of stage p−1 will be connected to the registers of stage p having the same indices, while register p+2 of stage p−1 will be connected with the value of '0'. More precisely, the register p+2 of stage p−1 of the VSR(!) will be reset (to zero, e.g.) so as to indicate invalidity of the corresponding data item, while the value of the data item stored in register p+2 of stage p−1 of the DSR(!) does not matter ("don't care" value) and will therefore be denoted "dummy data item". For this reason, it can also be reset to zero, for instance, as indicated in FIG. 16b. In summary, it can thus be stated that with the multiplexers 162-(p−1) set to their "N" positions, the complete contents of the p+1 registers of stage p (161-p) will be copied to the first (bottom) p+1 registers of the subsequent stage p−1 (161-(p−1)) at the next clock event, while a dummy data item is appended and stored in the additional register p+2 of stage p−1.

If, however, the associated RM flag indicates that the data item stored in register 166 needs to be repeated or punctured, the multiplexers 162-(p−1) connect their outputs with the inputs designated with "R" (for repetition) or "P" (for puncturing), depending on the value of the RM mode signal.

If the RM mode signal is set so as to indicate repetition ("R"), both the registers p−1 and p of stage p−1 are connected with register 166 so that the data item stored therein will be repeated at the next event of the common clock signal. The registers p+1 and p+2 of stage p−1 are connected to the registers p and p+1, respectively, of stage p.

If the RM mode signal is set so as to indicate puncturing ("P"), the registers p−1 and p of stage p−1 are connected to the registers p and p+1, respectively, of stage p, while registers p+1 and p+2 of stage p−1 are connected to '0' in order to receive dummy data items. In other words, the register 166 is not connected to any register of stage p−1 so that the data item contained therein will be punctured at the next clock event.

Figure 16C:
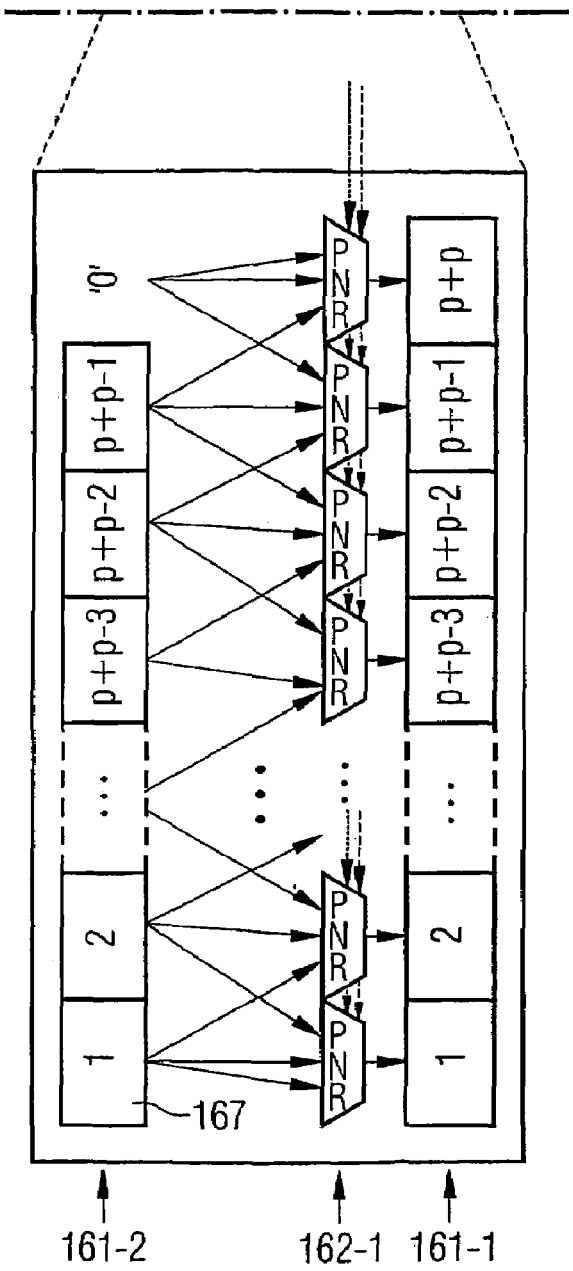

FIG. 16c provides a detailed view of the right dashed frame depicted in FIG. 16a, i.e. of the interface between the pipeline stages 2 and 1 of the DSR.(and thus of the VSR, too). On the left side of FIG. 16c, the 2*p−1 registers 161-2 part of stage 2 can be seen, while on the right side, the 2*p registers 161-1 of stage 1 are shown. Since the block diagram of FIG. 16c is devoted to the rate matching of the data item stored in the first (bottom) register of stage 2, i.e. in register 167, multiplexers 162-1 are connected to the inputs of all registers of stage 1 (161-1). If no rate matching ("N") is required for this data item, the registers of stage 2 will be connected with the registers of stage 1 having the same indices., while the (top) register 2*p of stage 1 will be connected to '0' (dummy data item). In case of repetition, register 167 will be connected to the two (bottom) registers 1 and 2 of stage 1, while register j=2, 3, . . . , 2*p−1 of stage 2 will be connected to the respective register j+1=3, 4, . . . , 2*p of stage 1. If the data item stored in register 167 needs to be punctured, this register will not be connected to any register of stage 1, while the register j=2, 3, . . . , 2*p−1 of stage 2 will be connected to the respective register j−1=1, 2, . . . , 2*p−2 of stage 1 and the registers 2*p−1 and 2*p of stage 1 will be connected to '0'.

Note that in stage 1, the valid items, i.e. the rate-matched data items, will be collected in the bottom registers of the set 161-1 of DSR registers with no gaps in between, while the invalid items, i.e. the dummy data items, are collected in the top registers thereof. This will be explained in more detail with respect to FIG. 17.

Figure 17B:
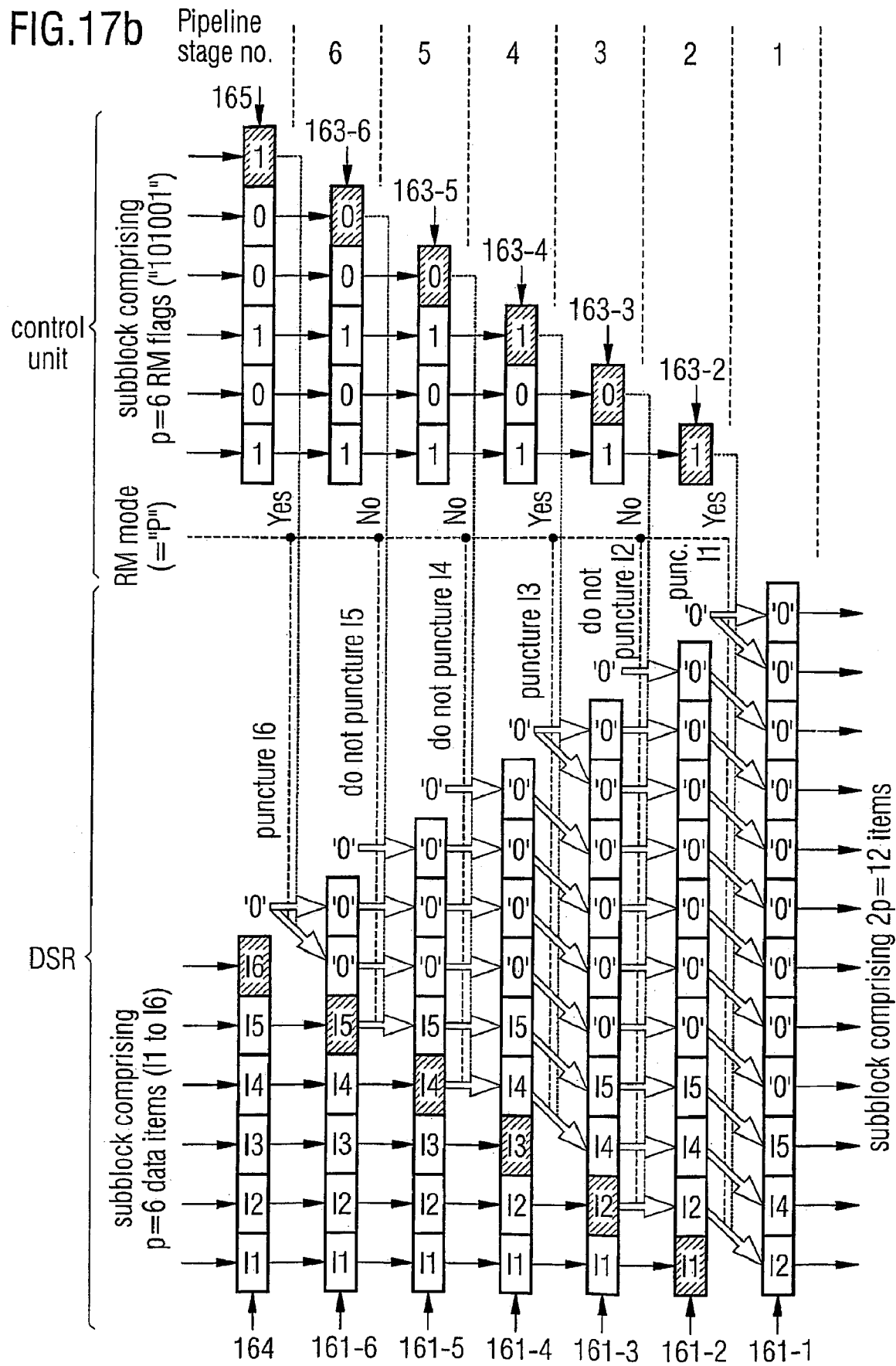
FIG. 17: Illustration of repetition, puncturing and shift operations performed in an exemplary configurable dual shift register according to FIG. 16.

FIGS. 17a and 17b show repetition, puncturing and shift operations performed in an exemplary configurable dual shift register according to FIG. 16. Using the arrangement of registers in the control unit and the DSR as shown in FIG. 16 and also the reference numerals of FIG. 16, FIGS. 17a and 17b illustrate how an exemplary subblock of p=6 data items I1, I2, . . . , I6 stored in the registers 164 and an exemplary subblock of p=6 associated RM flags stored in the registers 165 successively propagate through the p=6 pipeline stages as a consequence of p=6 subsequent clock events. For this purpose, the registers shown in FIGS. 17a and b are marked with the contents stored therein in a particular period of the common clock signal rather than with their indices, as was the case in FIGS. 16b and 16c.

The subblock of RM flags is assumed to have the value "101001" meaning that the $1^{st}$, $3^{rd}$ and $6^{th}$ data items in the subblock of data items need to be rate-matched while no rate-matching is to be performed for the $2^{nd}$, $4^{th}$ and $5^{th}$ data items (the same applies to the subblock of associated validity bits). The RM mode signal is set so as to indicate a mode of repetition ("R") in FIG. 17a and a mode of puncturing ("P") in FIG. 17b.

Fixed ("hardwired") connections are marked with thin arrows in FIGS. 17a and b, while switched connections are indicated by thick arrows. This is, instead of displaying the multiplexers of FIG. 16, FIGS. 17a and 17b show the connections established by the multiplexers as a consequence of the control signals resulting from the assumed values of the RM flags and RM mode signals. Hence, the control signals determine the origins (and thus the directions) of the thick arrows. They are marked with dashed lines in FIGS. 17a and 17b.

Referring to the repetition case considered in FIG. 17a, the subblocks of data items I1, ..., I6 and RM flags "101001" are stored in the sets of registers 164 and 165, respectively, in a first period of the common clock signal. Herein, the RM flag associated with the last data item is stored in the top (hatched) register of the set 165. Having a value of one, this RM flag indicates that the data item I6 stored in the top (hatched) register of the set 164 is to be rate-matched. Together with the RM mode signal (set to "R"), the two multiplexers between the input section and the $6^{th}$ pipeline stage of the DSR are controlled so as to establish the connections indicated by the two thick arrows in FIG. 17a. Given these two switched connections and the other five fixed connections between the input section and the $6^{th}$ stage of the DSR, it becomes clear that data item I6 will be copied twice to the $6^{th}$ stage at the next clock event while the other data items will be copied only once.

After this clock event, the $6^{th}$ stage of the DSR thus contains the p+1=7 items I1, I2, I3, I4, I5, I6, I6 so that I6 has been repeated, while the $6^{th}$ stage of the control unit contains just those RM flags associated with the first five data items (the RM flag associated with the $6^{th}$ data item has already been used and is therefore discarded). Now, the RM flag stored in the top (hatched) register of the set 163-6 and associated with the second last ($5^{th}$) data item I5 stored in the $5^{th}$ (hatched) register of the set 161-6, has a value of zero so that all four multiplexers between the $6^{th}$ and $5^{th}$ stages of the DSR establish horizontal connections (see FIG. 17a).

After the next clock event, the $5^{th}$ stage of the DSR therefore will contain the contents of the preceding ($6^{th}$) stage with an appended dummy data item: I1, I2, I3, I4, I5, I6, I6, '0'. As the RM flag stored in the top (hatched) register of 163-5 and associated with I4 stored in the $4^{th}$ (hatched) register of 161-5 also has a zero value, the six multiplexers between the $5^{th}$ and $4^{th}$ stages of the DSR will be controlled so as to append, at the next clock event, another dummy data item.

Thus, after this clock event, the fourth stage of the DSR will contain the p+3=9 items I1, I2, I3, I4, I5, I6, I6, '0', '0'. With the RM flag associated with I3 and stored in the top (hatched) register of 163-4 having a value of one, the eight multiplexers between the $4^{th}$ and $3^{rd}$ stages of the DSR are controlled so as to establish the connection indicated by the corresponding eight thick arrows in FIG. 17a.

As a result, I3 (stored in the $3^{rd}$ (hatched) register of 161-4) will be repeated at the next clock event so that the third stage will store the p+4=10 items I1, I2, I3, I3, I4, I5, I6, I6, '0', '0'.

At the next clock event, another dummy data item will be appended by establishing 10 horizontal connections between the $3^{rd}$ and $2^{nd}$ stages of the DSR as a consequence of the zero value of the RM flag associated with I2 and stored in the top (hatched) register of 163-3.

Finally, at the next clock event, I1 (stored in the $1^{st}$ (hatched) register of 161-2) will be copied twice and thus repeated by establishing the 12 connections shown in FIG. 17a between the $2^{nd}$ and $1^{st}$ stages of the DSR as a consequence of the one value of the RM flag associated with I1 and stored in 163-2. The first stage of the DSR will therefore contain the 2*p=12 items I1, I1, I2, I3, I3, I4, I5, I6, I6, '0', '0', '0', thereby confirming that the first, third, and sixth data items (I1, I3, I6) have been repeated in response to the p=6. RM flags "101001" while appending a total of three dummy data items to the nine rate-matched data items.

From the above description with respect to FIG. 17a, it can be concluded that the number of multiplexers and thus the number of switched connections begins with a value of two in stage p=6 and thereafter increases by two from stage to stage (left to right in FIG. 17a) until a value of 2*p is reached in stage 1. The total number of multiplexers thus amounts to p*(p+1)=42 in this example.

Also, it can be concluded that a zero value of the RM flag associated with the $j^{th}$ data item (wherein j=1,2, ..., p) controls the multiplexers of stage j so as to establish horizontal connections thereby appending a dummy data item at the next clock event.

In contrast, a "1" value of the RM flag associated with the j data item controls the multiplexers of stage j so as to establish a single[1] horizontal connection towards the j register of stage j, while diagonal connections pointing to the top right corner are established towards the registers j+1, j+2, ..., 2*p+1-j of stage j.

[1] Not counting the fixed horizontal connections.

With the RM mode signal set to "P", FIG. 17b refers to the puncturing case. Since the same subblock of RM flags is applied here ("101001"), the control signals derived from the RM flags are identical to those of FIG. 17a.

For those RM flags having a value of zero, the value of RM mode does not matter, as no rate-matching is to be performed anyway. This applies to the RM flags associated with the $2^{nd}$, $4^{th}$, and $5^{th}$ data items (I2, I4, I5) which control the multiplexers of the stages 5, 4, and 2 so as to establish horizontal connections between the stages 6-5, 5-4, and 3-2 identical to the ones shown in FIG. 17a.

However, for the RM flags having a value of one, i.e. for those associated with I1, I3, I6, different connections are established by the multiplexers of the stages 1, 3 and 6 (compared with FIG. 17a) due to the RM mode signal indicating that puncturing rather than repetition operations are to be performed.

Consider for instance the RM flag associated with the last data item (I6) and stored in the top (hatched) register of the set 165. Having a value of one, this RM flag indicates that the data item I6 (stored in the top (hatched) register of the set 164) is to be rate-matched. Together with the RM mode signal (set to "P"), the two multiplexers between the input section and the $6^{th}$ pipe-line stage of the DSR are controlled so as to establish the connections indicated by the two thick arrows in FIG. 17b. Given these two switched connections and the other five fixed connections between the input section and the $6^{th}$ stage of the DSR, it becomes clear that data item I6 will not be copied to the $6^{th}$ stage at the next clock event. Instead, it will be replaced with a dummy data item ('0') and an additional dummy data item will be appended. After this clock event, the $6^{th}$ stage of the DSR thus contains the p+1=7 items I1, I2, I3, I4, I5, '0', '0' so that I6 has been punctured.

Similar operations are performed for the RM flags associated with I3 and I1. Instead of the data item to be punctured (say I3, stored in the $3^{rd}$ (hatched) register of 161-4), the value in the register above it (I4, stored in the $4^{th}$ register of 161-4) is forwarded to the subsequent stage (161-3) without generating a gap ($3^{rd}$ register of 161-3). Also, the contents of the further registers above said data item to be punctured ($5^{th}$, $6^{th}$, etc. registers of 161-4) are forwarded to the subsequent stage without generating a gap ($4^{th}$, $5^{th}$, etc. registers of 161-3). As a consequence, two dummy data items must be appended in order to take into account that the subsequent stage comprises one register more than the preceding one.

Finally, the first stage of the DSR contains the 2*p=12 items I2, I4, I5, '0', '0', '0', '0', '0', '0', '0', '0', '0', thereby confirming that the first, third, and sixth data items (I1, I3, I6) have been punctured in response to the p=6 RM flags "101001" while appending a total of nine dummy data items to the three rate-matched data items.

It can be concluded from FIG. 17b that a "1" value of the RM flag associated with the $j^{th}$ data item controls the multiplexers of stage j so as to establish a single[2] horizontal connection towards the last (top) register of stage j, while diagonal connections pointing to the bottom right corner are established towards the registers j, j+1, ..., 2*p−j of stage j.

[2] Not counting the fixed horizontal connections.

From the above description with respect to FIGS. 17a and 17b, it can be seen that in both the repetition and the puncturing case, a subblock comprising 2*p items is available at the output of stage 1 of the DSR. It contains rate-matched data items as well as appended dummy data items. Herein, the number of rate-matched data items can range from 0 (all data items punctured) to 2*p (all data items repeated).

Due to the fact that the VSR has exactly the same structure as the DSR and receives the same control signals, precisely the same operations are performed in the VSR and the DSR. The only difference is that validity bits having a value of one propagate through the pipeline stages of the VSR. Therefore, stage 1 of the VSR will contain values of one (indicating validity) in those (bottom) registers, where stage 1 of the DSR contains rate-matched data items, while it will contain values of zero (indicating invalidity) in those (top) registers, where stage 1 of the DSR contains dummy data items.

Comparing the configurable dual shift register described above with respect to FIGS. 16 and 17 with the embodiment according to FIGS. 4-14, the following can be stated.

According to FIGS. 16 and 17, repetition operations are performed by repeating a single data item (and its associated validity bit) at a time, i.e. in a given pipeline stage. This allows to limit the number of source registers to three for each destination register in a given stage. This is in contrast to the embodiment described above with respect to FIGS. 4, 8, 12, where the number of source registers, which must be connectable to a destination register, amounts to p+1 in order to implement variable shift orders between p and 2 p.

Moreover, according to FIGS. 16 and 17, puncturing operations are performed by removing the respective data item together with its associated validity bit. This is in contrast to the embodiment described above with respect to FIGS. 5, 8, where puncturing operations are performed by resetting the associated validity bit while leaving untouched the data item to be punctured.

Concerning the requirements on rate matching implementations as formulated in the above section relating to the prior art, the following can be stated. According to FIG. 16a, the DSR comprises a total of p+1 stages (p pipeline stages plus an input section) consisting of (p+2*p)/2=1.5*p registers on average. The total number of registers in the DSR thus amounts to $$N_{reg} = 1.5 * p * (p+1). \quad (9)$$

With p having a value of 12 in exemplary rate matching apparati implemented by the applicant, merely $N_{reg}$=234 registers are required for the DSR. The same modest number of registers applies to the VSR, of course.

It is important to note that the number of registers according to equation (9) does not depend on the maximum number |A| of data items to be rate-matched in a coded data block (for a definition of A, see equation (2) and the related description). This is in contrast to the embodiment described above with respect to FIG. 12, where the total number of registers in the DSR amounts to $$N_{reg} = p * (|A_{Sub}|+1) \approx |A|+p, \quad (10)$$

as can be seen from equations (8) and equations (3)-(5). Given the fact that |A| can assume values as high as 1000 or even 10000, it becomes clear that the configurable dual shift register described above with respect to FIG. 12 requires many more registers when compared with the embodiment according to FIG. 16.

When comparing the dual shift register embodiments according to FIGS. 12 and 16, a further reduction in hardware complexity is associated with the multiplexers.

According to the embodiment of FIG. 12, multiplexers are required at the input of almost all registers of the DSR and VSR. More precisely, a total number of about |A| multiplexers is required in the DSR and also in the VSR. In contrast, the embodiment of FIG. 16 only requires (p+1)*p multiplexers in the DSR and also in the VSR, i.e. 156 for p=12.

In addition, the complexity of each multiplexer is reduced in the embodiment of FIG. 16. While relatively complex multiplexers with p+1 inputs are needed in accordance with FIG. 13 so as to implement variable order shift operations in the dual shift register of FIG. 12, relatively simple multiplexers with three inputs are sufficient according to FIG. 16b and c. As the skilled person will appreciate, less complex multiplexers between the register stages imply that the common clock frequency of the configurable dual shift register can be increased significantly, thereby allowing for higher input bit rates and/or lower delay values.

In addition, the hardware effort necessary to generate the control signals for the multiplexers is less complex in case of the embodiment described above with respect to FIG. 16.

In summary, it can be stated that the embodiment described above with respect to FIG. 16 (and 17) requires fewer registers, fewer and less complex multiplexers and a simpler control unit, thereby allowing for less complex rate matching apparati capable of coping with very high input rates and revealing low delay values while still meeting the other requirements formulated above in the section relating to the prior art.

Figure 18A:
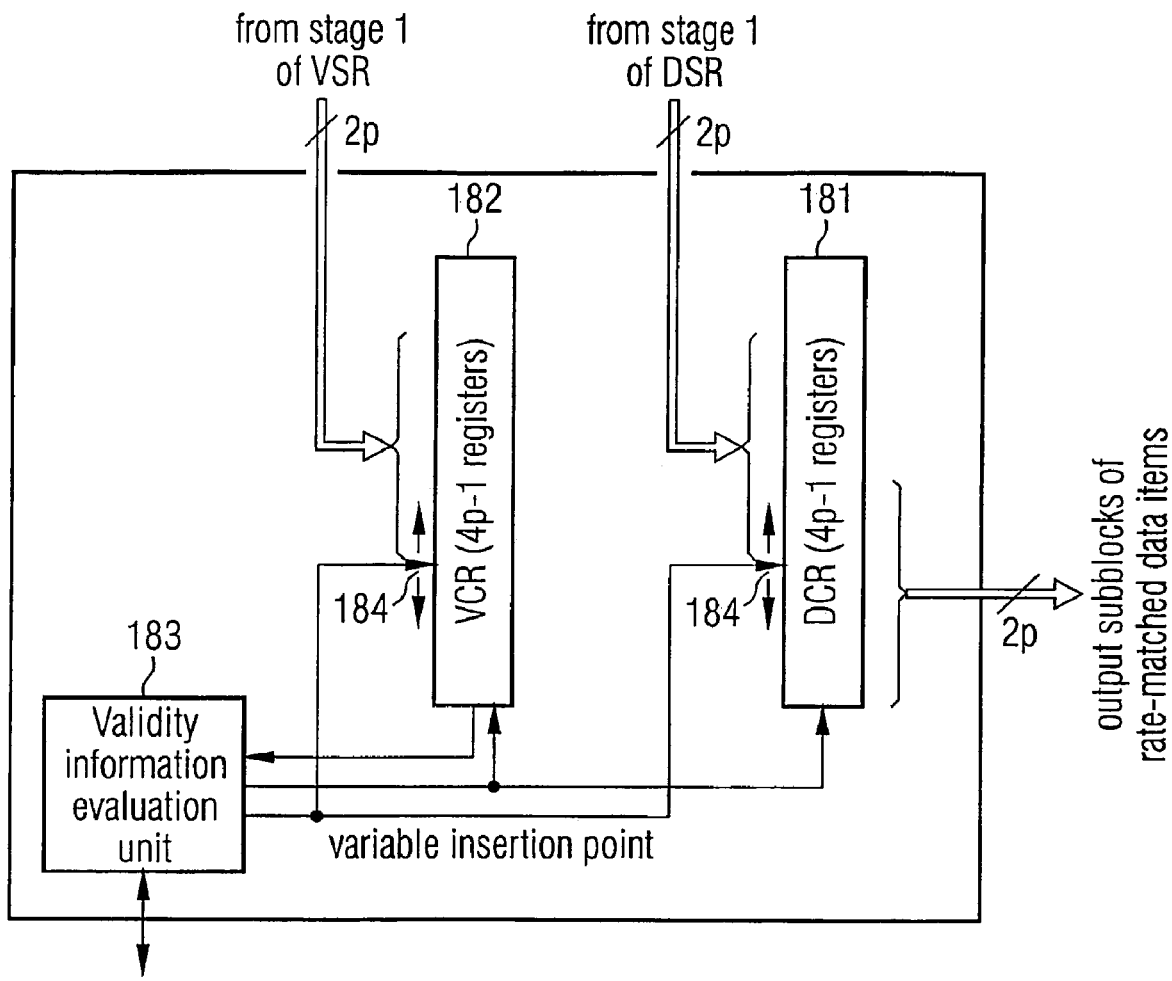
FIG. 18: Block diagram of another exemplary output handler according to the present invention.

FIG. 18a shows a block diagram of an exemplary output handler adapted to the configurable dual shift register described above with respect to FIG. 16. It includes a data collection register (DCR) 181, a validity collection register (VCR) 182, and a validity information evaluation unit 183 connected to both the DCR 181 and the VCR 182.

The DCR 181 and the VCR 182 include 4*p−1 registers each. The DCR 181 is connected to the set of 2*p registers 161-1 in stage 1 of the DSR as described above with respect to FIGS. 16a and c. Likewise, the VCR 182 is connected to the 2*p registers in stage 1 of the VSR. The DCR 181 and the VCR 182 are adapted to receive, at the rate of the common clock signal, subblocks comprising 2*p items from the DSR and the VSR, respectively.

In each cycle of the common clock signal, the validity information evaluation unit 183 evaluates the validity bits stored in the VCR 182 and determines a value of a variable insertion point therefrom. This variable insertion point is then applied as a starting address to both DCR and VCR. This is, the next subblocks from the DSR and VSR will be written into the DCR and VCR, respectively, from said starting address onwards. This is indicated in FIG. 18a by the two sets 184 of arrows.

From the contents of the DCR 181, output subblocks of rate-matched data items are generated, at the rate of the common clock signal, as follows. Whenever at least 2*p valid items are stored in the DCR 181, a subblock comprising 2*p rate-matched data items will be output. However, whenever less than 2*p valid items are stored in the DCR 181, the subblock size will be reduced to zero (i.e. no output will be generated) until the DCR 181 contains at least 2*p valid items.

Figure 18D:
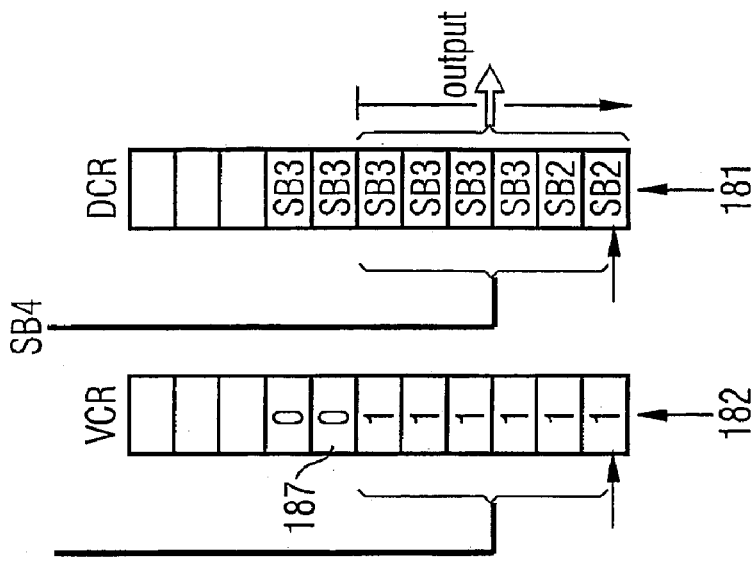
Figure 18C:
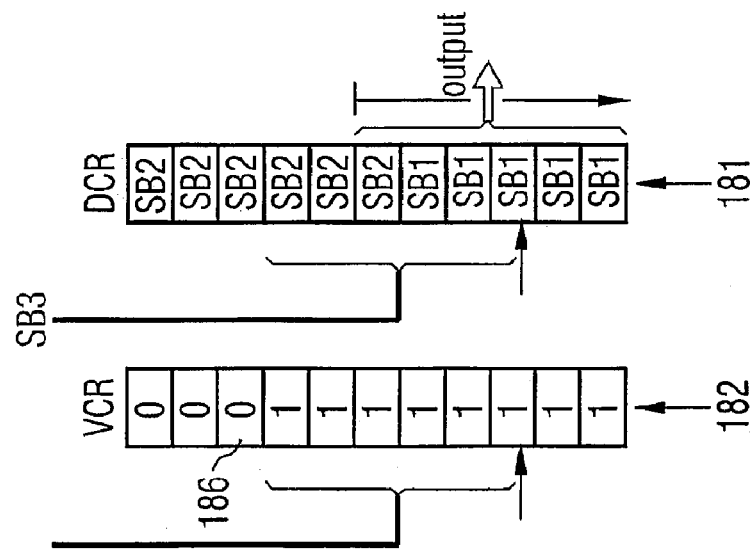
Figure 18B:
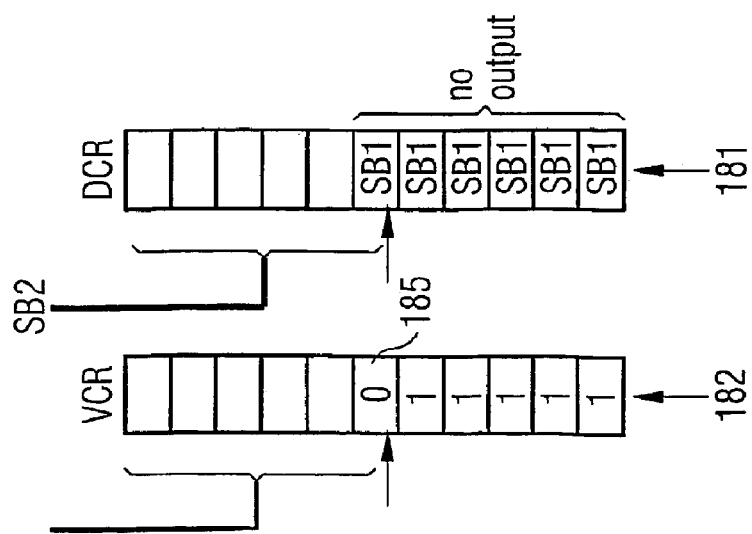

The operations performed in the exemplary output handler of FIG. 18a will be described in more detail with respect to FIGS. 18b to 18d. Herein, for ease of illustration, a value of p=3 is assumed so that the DCR and VCR comprise 4*p−1=11 registers each. FIGS. 18b to 18d display the contents of the DCR 181 and VCR 182 in three subsequent cycles of the common clock signal. The subblocks input from the DSR in three subsequent cycles are denoted SB1, SB2, SB3 etc. Herein, each subblock comprises 2*p=6 items which can either be valid items (rate-matched data items) or invalid items (dummy data items), as described above with respect to FIG. 17. In FIGS. 18b to 18d, validity and invalidity is indicated by marking the corresponding register of the VCR with a value of one and zero, respectively.

In FIG. 18b, it is assumed that subblock SB1 has been stored already in the bottom 2*p=6 registers of the DCR 181. As can be seen from the contents of the VCR 182, it is further assumed that SB1 contains 5 valid items (rate-matched data items) and a single invalid item (appended dummy data item). Given this scenario, when scanning the contents of the VCR "from bottom to top", the validity information evaluation unit 183 would determine that the first zero value is stored in the sixth register of the VCR designated with reference numeral 185. Therefore, the starting address (variable insertion point) would be set to 6, as indicated by two horizontal arrows in FIG. 18b. As a consequence, the next subblocks from the DSR (SB2) and VSR will be applied to the top six registers, i.e. registers 6, 7, ..., 11, of the DCR and VCR, respectively, as indicated in FIG. 18b by the two parentheses. As a further consequence, the validity information evaluation unit 183 would prevent the DCR from generating an output at the next clock event, because less than 2*p=6 valid items, namely 5, are stored in the DCR.

FIG. 18c displays the contents of the DCR and VCR after said next clock event. Subblock SB2 has been written into the top six registers of the DCR, thereby overwriting the final invalid item of subblock SB1. As can be seen from the top six registers of the VCR, it is assumed in FIG. 18c that SB2 contains three valid and three invalid items. Again, the validity information evaluation unit 183 would scan the contents of the VCR and determine that the first zero value now is stored in the 9$^{th}$ register of the VCR (register 186). Consequently, 2*p=6 valid items can be output from the bottom 2*p=6 registers of the DCR at the next clock event, as indicated in the bottom right part of FIG. 18c. In order to take into account the fact that the valid items which will have been output will need to be shifted "off" the DCR, the starting address is not set to 9 here, but to 9−2*p=3, as indicated by the horizontal arrows in FIG. 18c. Therefore, the next subblocks are applied to the registers 3, 4, ..., 8 of the DCR and VCR, respectively, as shown by the two left parentheses in FIG. 18c. Upon shifting down the contents of both the DCR and VCR by 2*p=6 register locations at said next clock event, they will enter the DCR and VCR.

FIG. 18d displays the contents of the DCR and VCR after said next clock event. Due to the shifting down, all valid data items of SB1 and the first valid data item of SB2 have disappeared from the DCR. Also, the associated validity bits from the VCR have disappeared. On the other hand, the final two valid items of SB2 and their validity bits now occupy the bottom two registers of the DCR and VCR, respectively. Also, subblock SB3 and its associated validity bits are now stored in registers three to eight of the DCR and VCR, respectively. Assuming that SB3 contains four valid items, a total of six valid items is thus available in the DCR again, so that another output subblock of 2*p=6 rate-matched data items will be generated at the next clock event. With the first zero value being stored in the 7$^{th}$ register (187) of the VCR, the starting address will be determined as 7−2*p=1 in analogy with the procedure described above with respect to FIG. 18c. As a result, SB4 and its associated validity bits will be applied to the bottom six registers of the DCR and the VCR, respectively, as indicated in FIG. 18d. They will enter the DCR and VCR once their contents has been shifted down by 2*p=6 register locations.

In summary, it can thus be stated that subblocks comprising 2*p rate-matched data items are output at the next clock event (followed by a down-shift of order 2*p) whenever at least 2*p valid items are present in the DCR beforehand. The starting address is set to the address of the register where the first (from bottom to top) zero validity bit is stored in the VCR, provided that this register is part of the bottom 2*p registers of the VCR. Otherwise, the starting address is set to the address of this register minus 2*p in order to make sure that sufficient space is available for the subsequent subblocks (hence the total number 4*p−1 of registers). From this, it can be seen that the variable insertion point, i.e. the starting address, may vary in a range of 1, 2, ..., 2*p.

It is to be noted that according to the description with respect to FIG. 18, the output handler is capable of delivering a stream of subblocks at the rate of the common clock signal, wherein (in contrast to the description with respect to FIGS. 9 and 14) each subblock comprises either 2 p or zero rate-matched data items (the last subblock possibly being padded with dummy data items). In so far, the stream of subblocks output by the output handler is not fully continuous.

Concerning the requirements on rate matching implementations as formulated in the above section relating to the prior art, the following can be stated. In accordance with FIG. 18a, the output handler includes a total of 2*(4*p−1) registers in the collection registers 181 and 182. In addition, the same number of multiplexers is used at the inputs of these registers so that the subblocks can be input at a variable insertion point (starting address). Herein, each multiplexer must have 2*p inputs connected to the 2*p registers of stage 1 of the DSR/VSR. The validity information evaluation unit 183 is required to search, in each cycle of the common clock signal, for a single zero in a total of 4*p−1 registers of the VCR.

In contrast, the output handler according to FIG. 14 includes p registers and p multiplexers, only. However, each multiplexer is required to have a very high number of inputs, namely $|A| \approx N_{reg} - p$. In addition, the validity information evaluation unit is required to search, in each clock cycle, for p ones in a very high number of registers in the VSR, namely in |A| registers thereof.

Given typical values of 1000 or even 10000 for |A|, it is clear from the above that the output handler of FIG. 18a further reduces complexity due to the less complex multiplexers and validity information evaluation unit.

As the skilled person will readily appreciate, a cascade structure according to FIG. 15 is also possible for the apparatus described above with respect to FIG. 16-18.

Further, from the description given above with respect to the present invention it is clear that the present invention also relates to a computer program product directly loadable into the internal memory of a telecommunication unit (such as a transceiver or transmitter of a base station or a mobile phone etc.) for performing the steps of the inventive flexible rate matching process in case the product is run on a processor of the communication unit.

Also, the invention relates to a processor program product stored on a processor usable medium and provided for flexible rate matching comprising processable readable program means to carry out any of the steps of the inventive flexible rate matching process.

Therefore, this further aspect of the present invention covers the use of the inventive concepts and principles for flexible rate matching within, e.g., mobile phones adapted to future applications. The provision of the computer program products allows for easy portability of the inventive concepts and principles as well as for a flexible implementation in case of re-specifications of the rate matching scheme(s).

The foregoing description of preferred embodiments has been presented for the purpose of illustration and description. It is not intended to be exhaustive or to limit the invention to the precise form disclosed. Obvious modifications or variations are possible in the light of the above technical teachings. The embodiments have been chosen and described to provide the best illustration of the principles underlying the present invention as well as its practical application and further to enable one of ordinary skill in the art to utilize the present invention in various embodiments and with various modifications as are suited to the particular use contemplated. All such modifications and variations are within the scope of the invention as determined by the appended claims.

LIST OF ABBREVIATIONS

3G: third generation
3GPP: third generation partnership project
ARIB: Japanese standardization body
ASIC: Application specific integrated circuit
BS: Base station
DB: Data block
DSP: Digital signal processor
DSR: Data shift register
ETSI: European Telecomm. Standardization Institute
FDD: Frequency division duplex
FPGA: Field programmable gate array
GSM: Global system for mobile communications
MT: Mobile terminal/station
PSTN: Public switched telephone network
RMS: Rate matching scheme
SB: Subblock
TS: Technical specification
VI: Validity information
VSR: Validity shift register
WCDMA: Wideband code division multiple access

LIST OF SYMBOLS

A: the number of data items (bits, e.g.) to be repeated or removed ("punctured") by the rate matching apparatus/method is denoted |A|,
a: number of data items (bits, e.g.) to be repeated or removed ("punctured") in the subblock under consideration by the rate matching apparatus/method,
C: number of data items (bits, e.g.) in the coded data block, i.e. the size (length) of the coded data block (input data block),
$C_{Sub}$: number of subblocks in the coded data block (input data block),
[clk i]: i-th clock event of the (common) clock signal,
K: number of bits in the uncoded data block, i.e. size (length) of the uncoded data block,
M: target block size (length), i.e. the number of data items (bits, e.g.) in the rate-matched data block (output data block),
$M_{Sub}$: number of subblocks in the rate-matched data block (output data block),
$N_{reg}$: total number of memory locations (registers) in each shift register (DSR/VSR),
$o_m$: configuration parameter for the multiplexer MUX-m of the output handler,
p: order of parallelization, number of data items (bits, e.g.) in each subblock,
$r_j$: j-th register of a shift register (DSR/VSR),
s: order/width of a shift (operation),
$s_j$: configuration parameter for the multiplexer MUX-j of the configurable shift register (DSR/VSR),
SB(i): i-th (input) subblock,
v: number of set validity bits stored in the VSR.

The invention claimed is:

1. A flexible rate matching apparatus, comprising:
a dual shift register having
a configurable data shift register adapted to receive a continuous stream of data items at a prespecified rate of a clock signal; and
a configurable validity shift register adapted to store, for each data item stored in the data shift register, an associated indication of validity, and adapted to shift the indications of validity at said prespecified rate;
a control unit adapted to modify the contents of the data shift register and the validity shift register through puncturing/repetition operations so as to achieve a rate matching; and
an output handler adapted to output valid data items at said prespecified rate using the indications of validity stored in the validity shift register.

2. The flexible rate matching apparatus according to claim 1, wherein said data shift register is adapted to receive a plurality of data items in each cycle of said clock signal.

3. The flexible rate matching apparatus according to claim 1, wherein the control unit comprises:
an input and rate matching (RM) control unit adapted to control said dual shift register;
an output control unit adapted to control said output handler; and
a flexible RM control unit adapted to coordinate and synchronize the operations of said input and RM control unit and said output control unit.

4. The flexible rate matching apparatus according to claim 3, wherein the control unit further comprises a computation unit adapted to determine positions where data items have to be rate-matched according to a rate matching scheme.

5. The flexible rate matching apparatus according to claim 1, wherein said puncturing operations include assigning a value indicating non-validity to those indications of validity associated with data items to be punctured.

6. The flexible rate matching apparatus according to claim 1, wherein said repetition operations include shifting the data items to be repeated as well as their associated indications of validity to at least two memory locations of the data shift register and the validity shift register, respectively.

7. The flexible rate matching apparatus according to claim 1, wherein the output handler is adapted to output data items, where the associated indications of validity stored in the validity shift register have a value indicating validity.

8. The flexible rate matching apparatus according to claim 1, characterized in that the apparatus has a cascade structure.

9. The flexible rate matching apparatus according to claim 1, wherein said puncturing operations include shifting the data items to be punctured as well as their associated indications of validity to no memory location of the data shift register and the validity shift register, respectively.

10. The flexible rate matching apparatus according to claim 1, wherein said dual shift register includes at least two pipeline stages, each having a different number of memory locations.

11. A flexible rate matching method, comprising the steps of:
   a) receiving a continuous stream of data items at a prespecified rate of a clock signal in a configurable data shift register;
   b) storing, for each data item stored in the data shift register, an associated indication of validity in a configurable validity shift register and shifting the indications of validity at said prespecified rate;
   c) modifying the contents of the data shift register and the validity shift register through puncture/repetition operations so as to achieve a rate matching; and
   d) outputting valid data items at said prespecified rate using said indications of validity stored in the validity shift register.

12. The flexible rate matching method according to claim 11, wherein the step of receiving the continuous stream of data items includes receiving a plurality of data items in the data shift register in each cycle of said clock signal.

13. The flexible rate matching method according to claim 11, further comprising determining positions where data items have to be rate-matched according to a rate matching scheme.

14. The flexible rate matching method according to claim 11, wherein said puncturing operations include assigning a value indicating non-validity to those indications of validity associated with data items to be punctured.

15. The flexible rate matching method according to claim 11, wherein said repetition operations include shifting the data items to be repeated as well as their associated indications of validity to at least two memory locations of the data shift register and the validity shift register, respectively.

16. The flexible rate matching method according to claim 11, wherein said step of outputting valid data items comprises continuously outputting data items where the associated indications of validity stored in the validity shift register have a value indicating validity.

17. The flexible rate matching method according to claim 11, wherein said puncturing operations include shifting the data items to be punctured as well as their associated indications of validity to no memory location of the data shift register and the validity shift register, respectively.

18. A computer program product directly loadable into the internal memory of a mobile communication unit, said computer program product comprising software code portions that run on a processor of the mobile communication unit and perform the steps of:
   receiving a continuous stream of data items at a prespecified rate of a clock signal in a configurable data shift register;
   storing, for each data item stored in the data shift register, an associated indication of validity in a configurable validity shift register and shifting the indications of validity at said prespecified rate;
   modifying the contents of the data shift register and the validity shift register through puncture/repetition operations so as to achieve a rate matching; and
   outputting valid data items at said prespecified rate using said indications of validity stored in the validity shift register.

19. A processor program product stored on a processor usable medium and provided for flexible rate matching, comprising:
   a processor readable program means for causing a processor to control reception of a continuous stream of data items at a prespecified rate by a configurable data shift register;
   a processor readable program means for causing the processor to store, for each data item stored in the data shift register, an associated indication of validity in a configurable validity shift register;
   a processor readable program means for causing a processor to modify the contents of the data shift register and the validity shift register through puncture/repetition operations so as to achieve a rate matching; and
   a processor readable program means for causing a processor to output valid data items at the prespecified clock rate using the indications of validity stored in the validity shift register.

* * * * *

UNITED STATES PATENT AND TRADEMARK OFFICE
CERTIFICATE OF CORRECTION

PATENT NO. : 7,437,655 B2
APPLICATION NO. : 10/500538
DATED : October 14, 2008
INVENTOR(S) : Morsberger et al.

Page 1 of 1

It is certified that error appears in the above-identified patent and that said Letters Patent is hereby corrected as shown below:

On the Title Page, in Field (75), under "Inventors", in Column 1, Line 2, delete "Forchheim" and insert -- Wiesenthal --, therefor.

On the Title Page, in Field (57), under "ABSTRACT", in Column 2, Line 5, delete "shirt" and insert -- shift --, therefor.

In Column 7, Line 44, delete "puntured" and insert -- punctured --, therefor.

In Column 9, Line 46, delete "apparats" and insert -- apparati --, therefor.

Signed and Sealed this

Twenty-third Day of March, 2010

David J. Kappos
*Director of the United States Patent and Trademark Office*